(12) United States Patent
Wu et al.

(10) Patent No.: US 9,796,915 B2
(45) Date of Patent: *Oct. 24, 2017

(54) LIGHT WEIGHT PROPPANT WITH IMPROVED STRENGTH AND METHODS OF MAKING SAME

(71) Applicant: Halliburton Energy Services, Inc., Houston, TX (US)

(72) Inventors: Shanghua Wu, Houston, TX (US); Jody Pham, Houston, TX (US); Yuming Xie, Houston, TX (US); Dilip K. Chatterjee, Houston, TX (US); Andrew Miller, Houston, TX (US); Christopher E. Coker, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/810,280

(22) Filed: Jul. 27, 2015

(65) Prior Publication Data

US 2015/0368548 A1 Dec. 24, 2015

Related U.S. Application Data

(63) Continuation of application No. 13/846,232, filed on Mar. 18, 2013, now abandoned, which is a continuation of application No. PCT/US2011/051712, filed on Sep. 15, 2011.

(60) Provisional application No. 61/384,875, filed on Sep. 21, 2010.

(51) Int. Cl.
*C09K 8/80* (2006.01)
*C04B 35/117* (2006.01)
*C04B 35/185* (2006.01)
*C04B 35/626* (2006.01)
*C04B 35/628* (2006.01)
*C04B 35/80* (2006.01)
*C04B 38/06* (2006.01)

(52) U.S. Cl.
CPC ............ *C09K 8/805* (2013.01); *C04B 35/117* (2013.01); *C04B 35/185* (2013.01); *C04B 35/6261* (2013.01); *C04B 35/62807* (2013.01); *C04B 35/803* (2013.01); *C04B 38/0615* (2013.01); *C09K 8/80* (2013.01); *C04B 2235/322* (2013.01); *C04B 2235/3217* (2013.01); *C04B 2235/3418* (2013.01); *C04B 2235/3472* (2013.01); *C04B 2235/36* (2013.01); *C04B 2235/3817* (2013.01); *C04B 2235/3826* (2013.01); *C04B 2235/526* (2013.01); *C04B 2235/528* (2013.01); *C04B 2235/5264* (2013.01); *C04B 2235/5268* (2013.01); *C04B 2235/5276* (2013.01); *C04B 2235/5409* (2013.01); *C04B 2235/5445* (2013.01); *C04B 2235/6028* (2013.01); *C04B 2235/724* (2013.01); *C04B 2235/77* (2013.01); *C04B 2235/80* (2013.01); *C04B 2235/94* (2013.01); *C04B 2235/96* (2013.01)

(58) Field of Classification Search
CPC .......... C09K 8/584; C09K 8/426; C09K 8/46; C09K 8/48; C09K 8/50; C09K 8/528; C09K 8/665; C09K 8/80; C09K 8/805; C09K 3/30; C09K 5/044; C09K 5/045; C09K 8/035; C09K 8/08; C09K 8/52; C09K 8/64

See application file for complete search history.

(56) References Cited

U.S. PATENT DOCUMENTS

| | | | | |
|---|---|---|---|---|
| 4,774,209 | A * | 9/1988 | Gadkaree | C04B 35/803 501/105 |
| 5,494,866 | A * | 2/1996 | Li | C04B 35/5935 501/92 |
| 2006/0016598 | A1 * | 1/2006 | Urbanek | C04B 38/009 166/280.2 |
| 2008/0135245 | A1 * | 6/2008 | Smith | C04B 35/04 166/280.2 |
| 2009/0038797 | A1 * | 2/2009 | Skala | C09K 8/80 166/280.1 |
| 2011/0160104 | A1 * | 6/2011 | Wu | C04B 35/195 507/269 |
| 2012/0157358 | A1 * | 6/2012 | Fang | E21B 43/267 507/269 |

FOREIGN PATENT DOCUMENTS

JP 05105508 A * 4/1993
JP 05200479 A * 8/1993

OTHER PUBLICATIONS http://en.wikipedia.org/wiki/Perlite downloaded on Apr. 25, 2014.*
H. K. Lee, S. Zerbetto, P. Colombo, C. G. Pantano, Glass-ceramics and composites containing aluminum borate whiskers, Ceramics International, 2010, 36, 1589-1596.*
http://en.wikipedia.org/wiki/Perlite downloaded on Apr. 25, 2014.*

* cited by examiner

*Primary Examiner* — Kumar R Bhushan
(74) *Attorney, Agent, or Firm* — Craig W. Roddy; Tumey LLP

(57) ABSTRACT

Methods are described to make strong, tough, and lightweight whisker-reinforced glass-ceramic composites through a self-toughening structure generated by viscous reaction sintering of a complex mixture of oxides. The invention further relates to strong, tough, and lightweight glass-ceramic composites that can be used as proppants and for other uses.

15 Claims, 5 Drawing Sheets

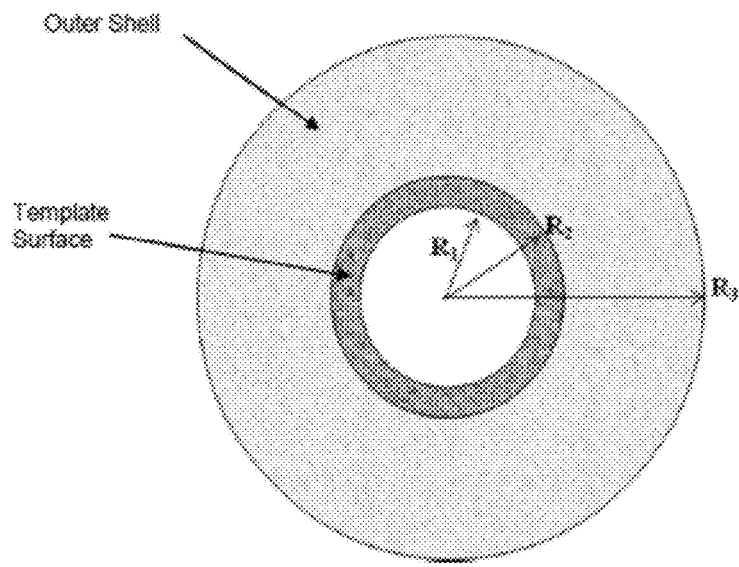
Figure 1. Schematic showing the structure of a proppant with a hollow template
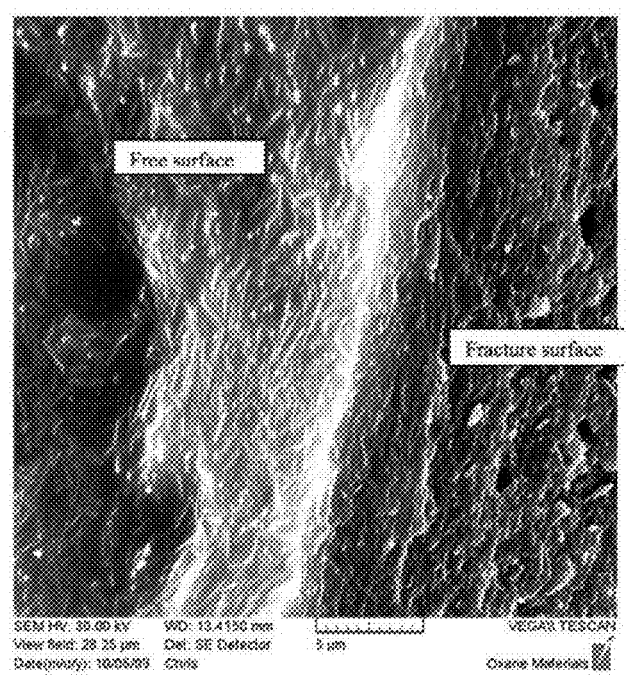
Figure 2: SEM image showing the microstructure of in-situ formed microwhiskers on the free and fracture surfaces of a proppant

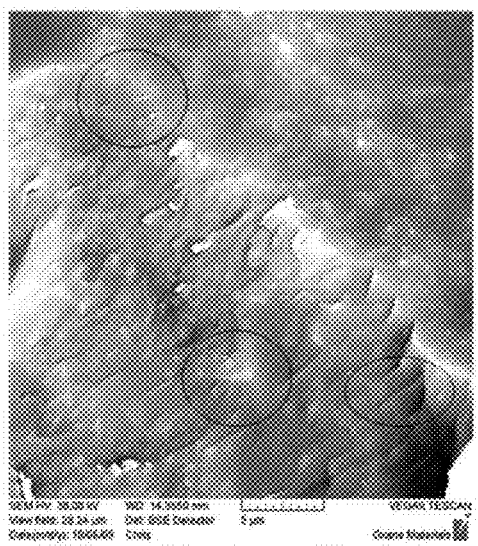
Figure 3: Evidence of pull-out of the micro-whiskers in the composite structure.
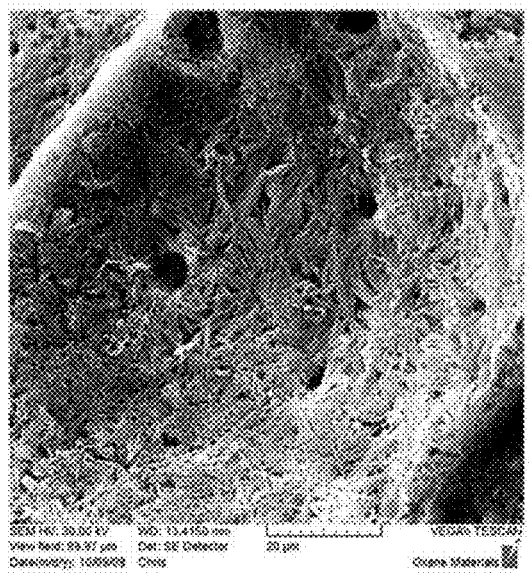
Figure 4: SEM image showing the texture fracture surface of the composite after leaching out the glass phase

| Composition | Perlite% in (Ceno+Perlite) | SG | Strength psi |
|---|---|---|---|
| 50%Al₂O₃-50%Ceno | 0.0% | 2.80 | 10354±1825 |
| 50%Al₂O₃-45%Ceno-5%Perlite | 10.0% | 2.84 | 10991±1553 |
| 50%Al₂O₃-40%Ceno-10%Perlite | 20.0% | 2.86 | 11154±2019 |
| 50%Al₂O₃-35%Ceno-15%Perlite | 30.0% | 2.87 | 11227±2021 |
| 50%Al₂O₃-30%Ceno-20%Perlite | 40.0% | 2.87 | 15988±2962 |
| 50%Al₂O₃-25%Ceno-25%Perlite | 50.0% | 2.88 | 12066±1743 |
| 50%Al₂O₃-20%Ceno-30%Perlite | 60.0% | 2.87 | 11970±1852 |
| 50%Al₂O₃-10%Ceno-40%Perlite | 80.0% | 2.83 | 10665±1744 |
| 50%Al₂O₃-50%Perlite | 100.0% | 2.80 | 9774±1976 |

Figure 5: Specific gravity and crush strength of proppants made with varying amounts of alumina, cenospheres and perlite.

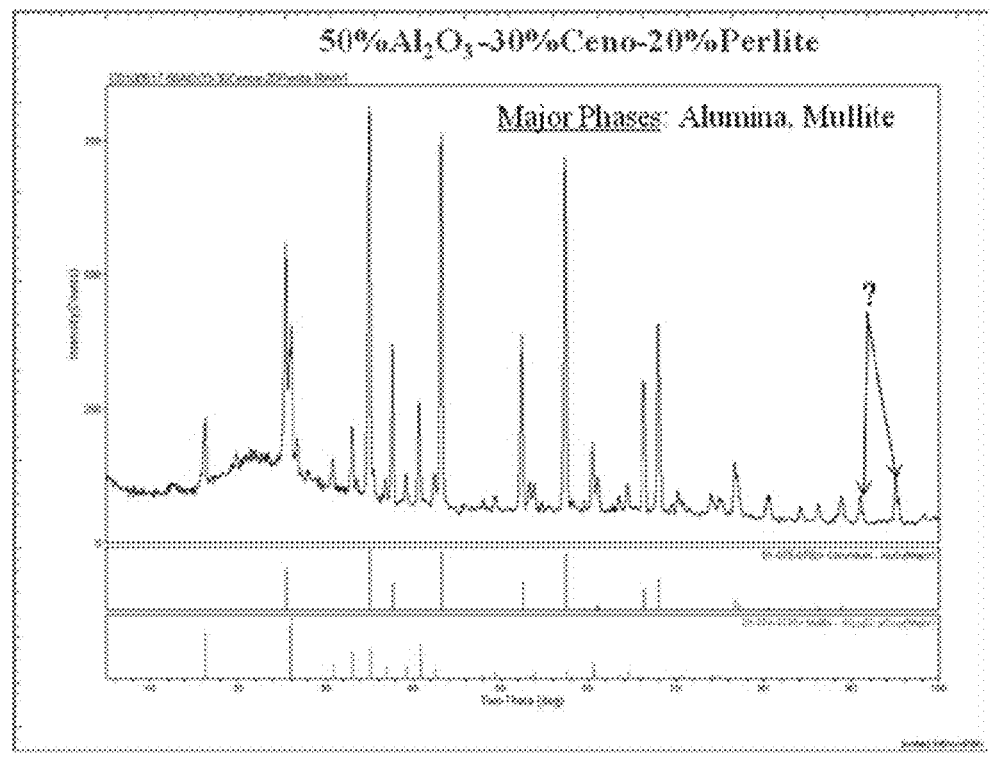

Figure 6: X-ray diffraction pattern showing corundum (α-Alumina) and mullite.

| Composition | SG | Strength psi | Strength/SG |
|---|---|---|---|
| CAM-A2 | 2.89 | 8705 | 3012 |
| CAM-A14 | 2.54 | 4356 | 1715 |
| CAM-A16SG | 3.00 | 13990 | 4663 |
| CAM-A1000 | 2.97 | 9652 | 3250 |
| CAM-AC2 | 2.41 | 3314 | 1375 |
| CAM-AKP50 | 3.08 | 15696 | 5096 |
| CAM-1%SiC07 | 2.72 | 11048 | 4062 |
| CAM-0.1%SiC10 | 2.43 | 9273 | 3816 |
| CAM-0.5%B4C07 | 2.86 | 11286 | 3946 |
| CAM-1%PMMA | 3.01 | 12722 | 4227 |
| CAM-1%SiC07 | 2.81 | 14348 | 5106 |
| CAM-0.1%SiC10 | 2.44 | 12483 | 5115 |
| 50%Al2O3-30%Ceno-20%Perlite | 2.87 | 15889 | 5536 |

Figure 7: Comparison of alumina-cenosphere compositions (CAM) with a selected alumina-cenosphere-perlite composition.

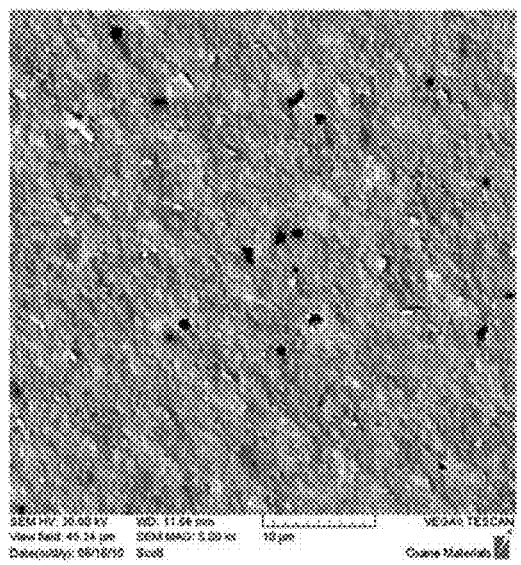

Figure 8: SEM Images showing the fractured surface of a split-tested pellet with composition: 50%Al$_2$O$_3$-30%Cenospheres-20%Perlite.

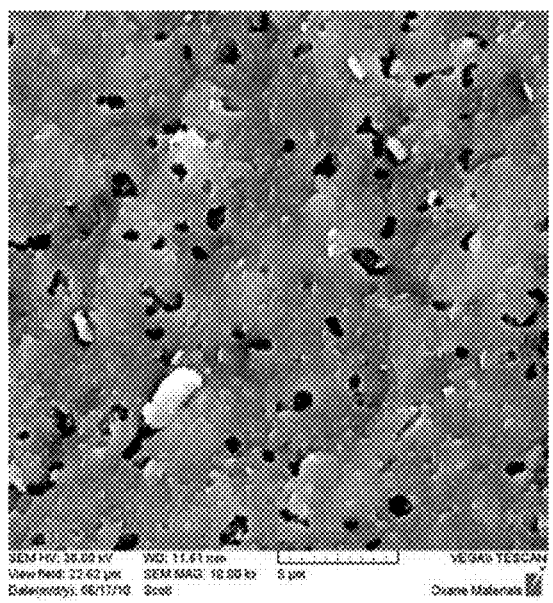
Figure 9: SEM Images showing the fractured surface of a split-tested pellet with composition: 50%Al2O3-50%Cenospheres.

LIGHT WEIGHT PROPPANT WITH IMPROVED STRENGTH AND METHODS OF MAKING SAME

This application is a continuation of U.S. patent application Ser. No. 13/846,232, filed on Mar. 18, 2013, which, in turn, is a continuation of International Patent Application No. PCT/US2011/051712, filed on Sep. 15, 2011, which, in turn, claims the benefit under 35 U.S.C. §119(e) of prior U.S. Provisional Patent Application No. 61/384,875, filed Sep. 21, 2010, the disclosures of which are incorporated in their entirety by reference herein.

BACKGROUND OF THE INVENTION

The present invention relates to methods to make strong, tough, and lightweight whisker-reinforced glass-ceramic composites. The method can involve forming a self-toughening structure generated by viscous reaction sintering of a complex mixture of oxides. The whisker-reinforced glass-ceramic preferably is strong, tough, and/or lightweight. The present invention further relates to strong, tough, and lightweight glass-ceramic composites used as proppants and for other uses including, but not limited to, armor plating, electronic, optical, high-temperature structural materials and applications, as a low dielectric constant substrate material in high-performance packaging applications; or window materials for the mid-infrared range.

The use of certain inorganic whiskers and fibers to reinforce glasses, glass ceramics, and ceramics has been known and practiced. Whiskers are typically characterized as relatively short, single-crystal fibers of small diameter, typically less than 100 microns. Fibers on the other hand can be multicrystalline or amorphous and are long enough to be used in woven or other types of interlocking networks, filter tows or fabric. Whiskers are typically incorporated in a selected glass or ceramic matrix as a randomly dispersed phase.

Fibers are more commonly used in an oriented or interlocking alignment. Load transfer by the matrix to the fibers through shear is the means by which fibers strengthen glass or ceramic bodies. The load transfers stress from the glass or ceramic matrix to the relatively long and high modulus fibers. The fibers can also impede crack initiation and propagation through the matrix material.

Whiskers can provide strengthening in a similar manner, but load transfer to the whiskers by the matrix is more limited because of the limited length and aspect ratio of the whiskers. Because whiskers are relatively short, they cannot carry as much load compared to the longer fibers. It is more difficult to take full advantage of the intrinsic strength of whiskers compared to fibers for this reason. Whisker reinforcement in ceramic and glass-ceramic materials is often used to increase toughness. A toughened ceramic material improves crack resistance, increases fatigue lifetime and/or provides a noncatastrophic mode of failure. Noncatastrophic failure is highly desirable in applications where repair can be facilitated and information about failure conditions is important.

Silicon carbide, silicon nitride, alumina, and carbon whiskers have all been used to reinforce non-metallic matrices. For example, U.S. Pat. No. 4,324,843 describes SiC fiber reinforced glass-ceramic composite bodies where the glass-ceramic matrix is an aluminosilicate composition. U.S. Pat. No. 4,464,192 describes whisker-reinforced glass-ceramic composites of an aluminosilicate composition. U.S. Pat. No. 4,464,475 describes similarly reinforced glass-ceramics with barium osumilite as the predominant crystal phase.

The use of whiskers in ceramic composites can improve the fracture toughness of the ceramic composite because of the whiskers' ability to absorb cracking energy. The whiskers appear to toughen the composites by deflecting crack propagation, bridging cracks and by whisker "pull-out." Whisker "pull-out" occurs when the ceramic matrix at the whisker-matrix interface cracks. When a crack-front propagates into the composite, many of the whiskers can bridge the crack line and extend into the ceramic matrix surrounding the crack. For the crack to grow or propagate through the ceramic, these whiskers must be either broken or pulled out of the matrix. As these whiskers are pulled out of the matrix, they provide a bridging force across the faces of the crack, reducing the intensity of the stress at the crack tip. In this way, the whiskers absorb the energy that would propagate the crack. Whisker pull-out reduces the tendency of a composite to crack and also inhibits crack propagation. U.S. Pat. Nos. 4,543,345; 4,569,886; and 4,657,877 relate to silicon carbide whisker-reinforced ceramic composites.

Perlite (sometimes spelled pearlite) is an amorphous volcanic glass that has a relatively high water content. Perlite is formed by the hydration of obsidian, a naturally occurring volcanic glass formed as an extrusive igneous rock. The typical chemical composition of perlite is $SiO_2$: 69-72%, $Al_2O_3$: 12-18%, $K_2O$: 3-4.5%, $Na_2O$: 3-4.5%, CaO: 0.1-0.2%, MgO: 0.2-0.5%, Moisture: 2-4%, where all percentages are weight percent. Perlite has the unusual property of greatly expanding when sufficiently heated. When perlite reaches temperatures of 850-900° C., it softens (since it is a glass). Water trapped in the structure of the perlite vaporises and escapes, causing an expansion of the perlite to 7-16 times its original volume. The expansion process of perlite requires rapid heating (around 900° C./min) and then removal of the particle from the heat zone. The expansion creates countless tiny bubbles leading to very low density. Special heating approaches such as steam or flame heating are usually employed to achieve the required heating rate. In a typical industrial furnace with a heating rate less than 200° C./min. the raw perlite cannot be expanded. Since perlite is a form of natural glass, it is chemically inert and has a pH around 7. Unexpanded perlite has a bulk density around 1.1 $g/cm^3$ and expanded perlite has a bulk density of about 30-150 $kg/m^3$. Expanded perlite is used in a variety of industrial applications as a filler because of its ability to expand and fill void spaces and because of its relatively low specific gravity. The majority of the applications of perlite are in building construction in the expanded form due to its low density, low thermal and acoustical conductivity, and non-flammability. Perlite is used as a loose fill insulation in masonry construction, an aggregate in concrete, an aggregate in Portland cement and an aggregate in gypsum plasters. Perlite is a relatively low cost material compared to other materials used in the formulation of glass-ceramic composites. The cost of perlite is approximately the same as sand. Perlite has been used in proppants and other ceramics primarily for its relatively low specific gravity. U.S. Patent Application Nos. 2005/0096207, 2006/0162929 and 2006/0016598, and U.S. Pat. No. 7,160,844 describe the use of perlite as a filler in proppants. U.S. Patent Application Nos. 2006/0177661 and 2009/0038797 describe the use of perlite as a lightweight template in proppants.

The production of glass-ceramic composites with whisker or fiber reinforcement usually involves dispersion of the whiskers or fibers in a green body prior to firing or sintering the green body to produce the final glass-ceramic reinforced composite. The methods in U.S. Pat. Nos. 4,543,345; 4,569,886; and 4,657,877 recite preformed whiskers dispersed in a ceramic precursor prior to forming a green body for sintering. Processes involving dispersion of preformed whiskers in a green body material have been difficult to successfully implement because whiskers have a tendency to agglomerate resulting in non-uniform concentrations of whiskers throughout the green body and ultimately in the ceramic composite. Non-uniform whisker concentration results in significant variance in the extent of reinforcement and toughening. As the percent by weight of whiskers in a green body material increases, agglomeration and clumping of whiskers increases. In addition, powdered ceramic precursor material may become imbedded within clumped whiskers. After sintering, the presence of these powders can significantly weaken the whiskers' reinforcing abilities.

A variety of granular particles are widely used as propping agents to maintain permeability in oil and gas formations. Three grades of proppants are typically employed: sand, resin-coated sand and ceramic proppants. Conventional proppants exhibit exceptional crush strength but also extreme density. A typical density of ceramic proppants exceeds 100 pounds per cubic foot. Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates. Proppants also add mechanical strength to the formation and thus help maintain flow rates over time. Proppants are principally used in gas wells, but do find applications in oil wells.

Relevant quality parameters include: particle density (low density is desirable), crush strength and hardness, particle size (value depends on formation type), particle size distribution (tight distributions are desirable), particle shape (spherical shape is desired), pore size (value depends on formation type and particle size, generally smaller is better), pore size distribution (tight distributions are desirable), surface smoothness, corrosion resistance, temperature stability, and hydrophilicity (hydro-neutral to phobic is desired). Lighter specific gravity proppants can be desirable, which are easier to transport in the fracturing fluid and therefore can be carried farther into the fracture before settling out and which can yield a wider propped fracture than higher specific gravity proppants.

Proppants used in the oil and gas industry are often sand and man-made ceramics. Sand is low cost and light weight, but low strength; man-made ceramics, mainly bauxite-based ceramics or mullite based ceramics are much stronger than sand, but heavier. Ceramic proppants dominate sand and resin-coated sand on the critical dimensions of crush strength and hardness. They offer some benefit in terms of maximum achievable particle size, corrosion and temperature capability. Extensive theoretical modeling and practical case experience suggest that conventional ceramic proppants offer compelling benefits relative to sand or resin-coated sand for most formations. Ceramic-driven flow rate and recovery improvements of 20% or more relative to conventional sand solutions are not uncommon.

Ceramic proppants were initially developed for use in deep wells (e.g., those deeper than 7,500 feet) where sand's crush strength is inadequate. In an attempt to expand their addressable market, ceramic proppant manufacturers have introduced products focused on wells of intermediate depth.

Resin-coated sands offer a number of advantages relative to conventional sand. First, resin coated sand exhibits higher crush strength than uncoated sand given that resin-coating disperses load stresses over a wider area. Second, resin-coated sands are "tacky" and thus exhibit reduced "proppant flow-back" relative to conventional sand proppants (e.g. the proppant stays in the formation better). Third, resin coating typically increases sphericity and roundness thereby reducing flow resistance through the proppant pack.

Ceramics are typically employed in wells of intermediate to deep depth. Shallow wells typically employ sand or no proppant.

SUMMARY OF THE INVENTION

A feature of the present invention is to provide a composite having a whisker phase and an amorphous phase.

A feature of the present invention is to provide a glass-ceramic composite having a mullite whisker phase and an amorphous phase.

A further feature of the present invention is to provide a glass-ceramic composite having a mullite whisker phase and an amorphous phase in which the whiskers are present in a three dimensional non-woven structure.

A further feature of the present invention is to provide a glass-ceramic composite having a mullite whisker phase and an amorphous phase in which the whiskers are uniformly dispersed.

A further feature of the present invention is to provide a glass ceramic composite with a uniform dispersion of relatively small pores with substantially spherical shape and a smooth interior pore surface.

A further feature of the present invention is to provide a method for making a composite having a whisker phase and an amorphous phase, wherein the whisker phase is pre-formed and/or formed in-situ.

A further feature of the present invention is to provide a method for making a glass-ceramic composite having a mullite whisker phase and an amorphous phase in which the mullite whiskers are pre-formed and/or formed in situ.

A further feature of the present invention is to provide a method for making strong, tough, and lightweight glass-ceramic matrix composites through a self-toughening structure generated by viscous reaction sintering of a complex mixture of oxides.

A further feature of the present invention is to provide a method for making strong, tough, and/or lightweight glass-ceramic matrix composites through a self-toughening structure that can be generated by producing a uniform dispersion of relatively small pores with substantially spherical shape and a smooth interior pore surface, and this can be done by liberating entrapped water and/or other vaporizable materials from an amorphous material, for instance, during a controlled viscous reaction sintering of a complex mixture of oxides.

A further feature of the present invention is to provide a method for making strong, tough, and/or lightweight glass-ceramic matrix composites including an optional fluxing agent.

A further feature of the present invention is to provide a glass-ceramic composite, such as in the form of a proppant, with superior crush strength.

A further feature of the present invention is to provide a proppant having a superior balance of crush strength and/or buoyancy as shown by specific gravity.

A further feature of the present invention is to provide a glass-ceramic composite, such as in the form of a proppant, with superior resistance to chemical attack, for instance, from acids and/or aqueous salt solutions.

A further feature of the present invention is to provide a glass-ceramic composite, such as in the form of a proppant, with a smooth external surface and containing pores with a high degree of sphericity and a smooth surface on the interior surface of the pores.

A further feature of the present invention is to provide a glass-ceramic composite, such as in the form of a proppant, with high strength, low specific gravity, and/or high chemical resistance at low cost.

A further feature of the present invention is to provide a proppant that can overcome one or more of the disadvantages described above.

To achieve one or more features of the present invention, the present invention relates to a method to produce a material, such as a composite, by forming a green body. The green body can be formed from a green body material. The green body material can include at least one metal oxide (such as a first metal oxide and a second metal oxide, wherein the first metal oxide is different from the second metal oxide). The metal oxides are preferably capable of forming whiskers in-situ, for instance, from or due to reactive or reaction sintering. The in-situ whiskers can be ceramic whiskers, mineral whiskers, metal oxide whiskers, or any combination thereof. The green body material further includes pre-formed whiskers that can be ceramic pre-formed whiskers, mineral pre-formed whiskers, and/or metal oxide pre-formed whiskers. The green body material further includes at least one whisker promoter. The green body may further include at least one amorphous material that contains entrapped water and/or other vaporizable materials. The amorphous material may have a specific gravity that is lower that the other green body materials thereby contributing to a lower proppant specific gravity. The method then involves sintering the green body under sintering conditions that preferably are reactive sintering conditions in order to form a material or sintered body having at least one whisker phase and at least one amorphous phase. An optional fluxing agent can be provided to enhance mixing of and sintering of the green body material. The method can further involve controlling the sintering process to liberate water or other materials entrapped in an amorphous material in a controlled manner such that the liberated gas forms a relatively small number of substantially uniformly distributed pores having a substantially spherical shape in the sintered body.

An example of a method for producing a self-toughened high-strength glass-ceramic composite can be as follows. The method can include forming a green body from a green body material. The green body material can include:
  a) alumina and/or at least one alumina precursor and a siliceous material in a controlled ratio to form mullite whiskers in a glass-ceramic composite, and
  b) a minor amount of mullite whiskers, and
  c) at least one whisker promoter in the absence of fluorine or fluorine compounds, and
  d) perlite and/or at least one amorphous material containing at least one entrapped vaporizable material such as water, and
  e) optionally, at least one fluxing agent such as nepheline syenite, feldspar, clay, and/or similar materials.

The method can include sintering the green body under sintering conditions to form in situ a glass-ceramic composite with at least one mullite whisker phase and at least one amorphous phase. The method can further include controlling the sintering conditions such that the water in the perlite and/or the vaporizable material in an amorphous material is liberated to form a relatively small number of substantially uniformly distributed pores having substantially spherical shape in the sintered body.

The present invention further relates to materials, composites, or particles of the present invention. The material of the present invention has a whisker phase and at least one amorphous phase. The material can further include pre-formed whiskers. The in-situ whiskers can be uniformly distributed throughout the material. The in-situ whiskers can have a concentration that is uniform throughout the material. As an option, there is no agglomeration or clumping of the pre-formed and/or in-situ whiskers in the material. The whiskers can be present in a three-dimensional non-woven structure or pattern in the material. The whisker phase of the pre-formed and/or in-situ whiskers can be a continuous phase, or can be a non-continuous phase, depending on the concentration of the whiskers that make the whisker phase. The amorphous material, such as perlite, can have a lower specific gravity than the other materials in the green body material. The material of the present invention can include a relatively small number of substantially uniformly distributed pores having substantially spherical shape in the sintered body.

The present invention further provides a new and improved propping agent, and a method of making and use thereof, that overcomes the above-referenced problems and others. The present invention also relates to a ceramic proppant having a unique microstructure that includes whiskers arranged in a random alignment, and optionally having reduced density, and/or improved strength. The whiskers can be employed to reinforce the ceramic proppant and/or dissipate energy during crack propagation. The microstructure can also include anisotropic crystals, for example, crystals elongated along the C-axis. The proppant can have a reduced density such that the proppant has a low specific gravity while optionally maintaining improved mechanical and/or flexural strength. As an option, the present invention provides a proppant having substantially spherical shape and a smooth exterior surface. The present invention can include a relatively small number of substantially uniformly distributed pores having substantially spherical shape in the sintered body where such pores can contribute to reducing the density of the proppant. The small size, uniform distribution, and/or substantially spherical shape of the pores contribute to improved toughness, strength and/or crush resistance of the proppant. The present invention can provide a proppant having improved resistance to chemical attack, such as from acids and/or aqueous salt solutions.

The present invention further relates to a method of producing a ceramic proppant that employs a reactive sintering process to form whiskers in-situ through the chemical reaction of raw materials and, optionally, to form a relatively small number of substantially uniformly distributed pores having substantially spherical shape in the ceramic proppant, such as through the use of controlled sintering of amorphous materials having inclusions of a vaporizable material. Pores may also be produced through the use of pore formers which form pores through chemical reaction and/or thermal decomposition to form a gas. The method allows the porosity, such as pore size, pore size distribution, and/or pore shape, of the proppant, to be controlled. Alterations to the porosity can have a large impact on reducing the specific gravity while maintaining mechanical and/or flexural strength.

The proppant can be used in any application suitable for a proppant. The present invention accordingly relates to a method to prop open subterranean formation fractions using the proppant.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIG. 1 is a schematic showing the structure of a proppant with a hollow template.

FIG. 2 is a SEM image showing the microstructure of in-situ formed microwhiskers on the free and fracture surfaces of a proppant.

FIG. 3 is a SEM image showing evidence of pull-out of micro-whiskers in a composite structure.

FIG. 4 is a SEM image showing the texture fracture surface of a composite after leaching out the glass phase.

FIG. 5 is a chart showing specific gravity and crush strength of proppants made with varying amounts (in wt %) of alumina, cenospheres and perlite.

FIG. 6 is an X-ray diffraction pattern showing corundum (1a-Alumina) and mullite for a composite made with 50 wt % $Al_2O_3$. 30 wt % Cenosphere, and 20 wt % Perlite.

FIG. 7 is a comparison of alumina-cenosphere compositions (CAM) with a selected alumina-cenosphere-perlite composition (all percents are wt %).

FIG. 8 is a SEM image showing the fractured surface of a split-tested pellet with composition: 50 wt % $Al_2O_3$-30 wt % Cenospheres-20 wt % Perlite.

FIG. 9 is a SEM image showing the fractured surface of a split-tested pellet with composition: 50 wt % $Al_2O_3$-50 wt % Cenospheres.

DETAILED DESCRIPTION OF THE PRESENT INVENTION

The present invention relates to a material (e.g., particles, agglomerates, an article, and the like) that includes whiskers and an amorphous phase. The material can be referred to as a sintered body. The material can be a composite of two or more materials, which, in this case, would be at least the whiskers and the amorphous phase present in the same material. The material can have a smooth and continuous surface. Optionally, the amorphous phase may contain pores with a smooth interior surface that are present in the amorphous phase and within the smooth exterior surface of the material. Optionally, at least one crystalline particulate phase is present in the material. The material of the present invention can include whiskers that are in a matrix that includes at least one metal oxide, such as silica. The matrix can include other components or ingredients as mentioned herein. The matrix is preferably at least amorphous (e.g., having an amorphous phase). For purposes of the present invention, the material can include whiskers or a whisker phase and an amorphous phase, for instance, that can include silica and/or other metal oxides.

For purposes of the present invention, the material of the present invention will be described in terms of its preferred form or shape, namely particles that can be used in a variety of end use applications, such as for proppant uses in hydrocarbon recovery. While the preferred shape and preferred materials of the present invention are described in detail below, it is to be understood that this is simply for exemplary purposes and in no way limits the scope of the present invention with respect to shape, materials, and/or end uses. While the term "proppant" is used at times in the application, it is understood that this term is not meant to be limited to its end use application, but for purposes of the present invention, it is to be understood that the proppant or particles, which are used as proppants, can be used in any end use application where ceramic material is useful.

Also, for purposes of the present invention, it is to be understood that the term "whiskers" as used herein can include what is traditionally known as whiskers, namely a length of less than 1 micron, or can include what is traditionally know as "fibers," namely a length of 1 micron or more, or both.

The material or particles of the present invention can be characterized as composites and these composites can be glass-ceramic composites due to the glassy phase or glassy components present in the composite and due to the ceramic phase or ceramic components present in the composite.

The preferred material or particles of the present invention have whiskers distributed in a matrix (e.g., glassy matrix), wherein the matrix includes at least one metal oxide, such as silica. The matrix can be considered amorphous or to have the amorphous phase. Preferably, the amorphous phase is present throughout the material and preferably distributed in a uniform manner. The whiskers are preferably distributed in a glassy matrix. The glassy matrix can include at least one metal oxide, such as silica or a silicon-containing oxide. The glassy matrix may contain small pores that are uniformly distributed in the amorphous phase and can be essentially spherical and can possess a smooth interior surface. The exterior surface of the material or particles can have a smooth and continuous exterior surface.

In more detail, the material of the present invention can include from about 0.01% by weight to about 99.9% by weight (based on the weight of the material) of the matrix or amorphous phase. The matrix or amorphous phase can include a silicon-containing oxide (e.g., silica), and optionally at least one iron oxide; optionally at least one potassium oxide; optionally at least one calcium oxide; optionally at least one sodium oxide; optionally at least one titanium oxide; and/or optionally at least one magnesium oxide, or any combinations thereof. Preferably, the matrix or amorphous phase contains one or more or each of these optional oxides, such as in various amounts. Preferably, the silicon-containing oxide is the major component by weight in the matrix or amorphous phase, such as where the silicon-containing oxide is present in an amount of at least 75% by weight, at least 85% by weight, at least 90% by weight, at least 95% by weight, at least 97% by weight, at least 98% by weight, at least 99% by weight (such as from 75% by weight to 99% by weight, from 90% by weight to 95% by weight, from 90% by weight to 97% by weight) based on the weight of the matrix or amorphous phase. Exemplary oxides that can be present in the amorphous phase include, but are not limited to, $SiO_2$, $Al_2O_3$, $Fe_2O_3$, $Fe_3O_4$, $K_2O$, $CaO$, $Na_2O$, $TiO_2$, and/or $MgO$. It is to be understood that, for purposes of the present invention, other metals and/or metal oxides can be present in the matrix or amorphous phase.

The material can include one or more minerals and/or ores, one or more clays, and/or one or more silicates, and/or one more solid solutions. The minerals or ores can be aluminum-containing minerals or ores and/or silicon-containing minerals or ores. These can be present as particulates. These additional components can be present as at least one crystalline particulate phase that can be non-continuous phase or continuous phase in the material. More specific examples include, but are not limited to, alumina, aluminum hydroxide, bauxite, gibbsite, boehmite or diaspore, ground cenosheres, perlite, stober silica, fly ash, unreacted silica, silicate materials, quartz, feldspar, zeolites, bauxite and/or calcined clays. These components in a combined amount can be present in the material in an amount, for instance, of from 0.001 wt % to 10 wt % or more, such as from 0.01 wt % to 10 wt %, 0.1 wt % to 8 wt %, 0.5 wt % to 5 wt %, 0.75 wt % to 5 wt %, 0.5 wt % to 3 wt %, 0.5 wt % to 2 wt % based on the weight of the material. These additional components can be uniformly dispersed throughout the matrix or amorphous phase (like filler is present in a matrix as discrete particulates). As an option, the matrix or amorphous phase does not contain or contains significantly low amounts of halides. For example, as an option, the matrix or amorphous phase contains 0.1 wt % or less of a halide (e.g., F, Cl, Br, I) or a halide compound, such as 0.01 wt % or less, 0.001 wt % or less, or 0.0001 wt % or less, and preferably, 0 wt % of a halide, based on the weight of the amorphous phase. As an option, the matrix or amorphous phase contains low amounts or 0 wt % of fluorine, but with no limitations on the amounts of the other halides. In this option, the fluorine amount can be the halide amount as mentioned above. It is understood that these weight percents are based on the elemental halide, such as elemental fluorine, and further based on the total weight of the amorphous phase or matrix.

The material can include at least one amorphous material that contains an entrapped vaporizable material such as water. As an option, the entrapped vaporizable material can be present in other parts of the material, such as in the crystalline phase, if present. The amorphous material that contains an entrapped vaporizable material can have a lower specific gravity than the other green body materials. Examples of the amorphous material include perlite, stober silica, pumice, andesite, scoria, volcanic glasses or any combination thereof. The amorphous material that contains an entrapped vaporizable material, such as water, can be present by weight in the matrix or amorphous phase in an amount of at least 5% by weight, at least 10% by weight, at least 15% by weight, at least 20% by weight, at least 25% by weight, at least 30% by weight, at least 35% by weight, at least 40% by weight, such as from 5% by weight to 40% by weight, from 10% by weight to 35% by weight, from 15% by weight to 25% by weight. The entrapped vaporizable material may comprise vaporizable water ($H_2O$), carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases or any combination thereof.

In the present invention, the matrix or amorphous phase can be a continuous phase present in the material of the present invention.

One component that can be further present in the material or in the matrix or amorphous phase can be $B_2O_3$ and/or one or more transition metal oxides, such as $Fe_2O_3$, $TiO_2$, CoO, and/or NiO, or any combinations thereof. The $B_2O_3$ and/or transition metal oxides can be present in the matrix or amorphous phase in various amounts, such as in low or trace amounts, for instance, 1 wt % or less, such as 0.5 wt % or less, such as 0.25 wt % or less, such as 0.01 wt % to 0.001 wt %, based on the weight of amorphous phase.

As an option, one or more carbides, such as SiC and/or other forms can be present in the material (e.g., sintered body). The carbide can be present as particles, particulates, and/or fibers and/or whiskers. As an option, the carbide in part, or in its entirety, is not used as a pore former, but is used as a particulate or fiber or whisker that remains as part of the material (e.g. sintered body). This can be achieved, for instance, by sintering in an inert atmosphere (and not an oxygen containing atmosphere). This controlled sintering avoids the carbide reacting and forming a gas bubble. The carbide in this form can be present in any amount, such as from about 0.01% by weight to 25% by weight or more, based on the weight of the material (e.g. sintered body). The material (e.g., sintered body) can be a solid material (i.e., no template or no hollow template in the interior) or the material can have such a template. The material can be porous or non-porous. The material can have microspheres (pre-formed or in situ formed) as an option. The range of SiC particle size used in the green body material can have effects on both microsphere placement and/or size and strength enhancement in the composite proppant product. The SiC or other carbide powder used in the green body material should have a small size with a large enough surface area to allow the oxidation to proceed as desired. SiC particles can have a particle size distribution with $d_{fs}$ from about 0.5 to about 5.0 and from about 0.5 to about 1.5, wherein, $d_{fs}=\{(d_{f90}-d_{f10})/d_{f50}\}$ wherein $d_{f10}$ is a particle size wherein 10% (by volume) of the particles have a smaller particle size, $d_{f50}$ is a median particle size wherein 50% (by volume) of the particles have a smaller particle size, and $d_{f90}$ is a particle size wherein 90% (by volume) of the particles have a smaller particle size. The median particle size, $d_{f50}$, of the SiC is from about 0.01 μm to about 100 μm or from about 0.2 μm to about 5 μm, wherein $d_{f50}$ is a median particle size where 50% (by volume) of the particles of the distribution have a smaller particle size. The SiC can be present in an amount of from about 0.01 to about 50 wt %, by weight of the green body or from about 0.01 to about 10 wt %, by weight of the green body. The silicon carbide can have a surface area (BET) of from about 0.5 $m^2/g$ to about 100 $m^2/g$ or from about 8 $m^2/g$ to about 15 $m^2/g$. These properties can remained in the sintered body as well or be within 10% or within 20% or within 40% of these parameters.

As an option, the matrix or amorphous phase can have no pores in this phase. As an option, the matrix or amorphous phase can be porous.

With regard to the whiskers, the whiskers can be considered to be in the form of needles, for instance, as shown in some of the figures of the present invention. The whiskers can be mineral-based or metal oxide-based whiskers or can be considered whiskers formed of one or more minerals and/or metal oxides. Preferably, the whiskers are mullite whiskers (e.g., needle-shaped mullites). The whiskers can be silicate mineral whiskers or whiskers made of one or more silicate minerals.

The whiskers present in the material of the present invention can be or include in-situ whiskers, which, for purposes of the present invention, refer to the fact that the whiskers are formed during the formation of the material of the present invention (e.g., during formation of the composite of the present invention as a result of reactive sintering). The in-situ whiskers can have a different morphology from the pre-formed whiskers. Preferably, the in-situ whiskers can have diameters of from 0.05 micron to about 2 microns (e.g., from 0.05 micron to 2 microns, 0.05 micron to 1.5 microns, 0.05 micron to 1 micron, 0.1 micron to 1 micron, 0.5 micron to 1 micron, 0.75 micron to 1.5 microns). The in-situ whiskers can have an aspect ratio of from about 10 to about 100 (e.g., from 10 to 75, from 15 to 100, from 20 to 100, from 10 to 45, from 15 to 40, from 20 to 35). The in-situ whiskers have a length of from about 1 micron to about 50 microns (e.g., from 1 micron to 40 microns, from 1 micron to 30 microns, from 1 micron to 20 microns, from 1 micron to 10 microns, from 1 micron to 5 microns, from 5 microns to 50 microns, from 10 microns to 50 microns, from 15 microns to 50 microns, from 20 microns to 50 microns, from 25 microns to 50 microns, and the like). It is to be understood that the in-situ whiskers can be a combination of various diameters, and/or various aspect ratios, and/or various lengths. It is to be understood that the in-situ whiskers can have relatively consistent diameters with varying aspect ratios and/or varying lengths. The in-situ whiskers can have relatively consistent aspect ratios and varying diameters and/or varying lengths. The in-situ whiskers can have relatively consistent lengths and varying diameters and/or varying aspect ratios. With respect to consistent diameters and/or consistent aspect ratios and/or consistent lengths, it is to be understood, for purposes of the present invention, that consistent refers to diameters, aspect ratios, and/or lengths that are within 25%, or within 10%, or within 5%, or within 1% of the other diameters and/or other aspect ratios, and/or other lengths of the in-situ whiskers. The various ranges for the diameters, aspect ratios, and/or lengths, for purposes of the present invention, can be considered average diameters, average aspect ratios, and/or average lengths. As an option, these ranges can be considered maximum values for the diameters, and/or aspect ratios, and/or lengths.

The in-situ whiskers can be present in the material of the present invention in various amounts. For instance, the concentration of the in-situ whiskers can be present in an amount of from 0.1 wt % to 99.9 wt % based on the weight of the material Preferably, the concentration of the in-situ whiskers is present in an amount of from about 10 wt % to about 50% (such as from 15% to 45 wt %, 20 wt % to 45 wt %, 30 wt % to 45 wt %, 30 wt % to 40, and the like), based on the weight of the material.

The in-situ whiskers can be uniformly distributed throughout the material (e.g., uniform concentration) of the present invention. The in-situ whiskers can be considered a continuous phase or can be considered a whisker phase in the material of the present invention. The reference to continuous phase is a reference to in-situ whiskers that can, as an option, be present in such an amount that the in-situ whiskers contact or touch each other (in two or three dimensions throughout the material) and, therefore, form a continuous phase throughout the material of the present invention. The concentration of the in-situ whiskers can be the same throughout the material or can be different, such as in the form of gradients, wherein one region of the material can have a higher concentration of in-situ whiskers compared to another region, such as a surface region versus a non-surface region.

Besides the in-situ whiskers or in lieu of the material of the present invention can include pre-formed whiskers, such as pre-formed mineral-based or metal oxide-based whiskers, such as mullite whiskers or needle-shaped mullite that is pre-formed. The pre-formed whiskers can have and preferably have a different morphology from the in-situ whiskers. For instance, the pre-formed whiskers can be micro-, sub-micro, or nano-whiskers. The pre-formed whiskers can be whisker seeds. The pre-formed whiskers can have an aspect ratio of from 1 to 20, such as 1 to 5. The pre-formed whiskers can have a length of from 0.01 to 1 micron, such as from 0.01 to 0.75 micron, from 0.1 to 0.875 micron, from 0.1 to 0.5 micron. The pre-formed whiskers can have a diameter of from about 0.01 to 0.5 micron (e.g., from 0.01 to 0.3 micron). The pre-formed whiskers can be present in the material of the present invention in an amount of from about 0.001 wt % to 40 wt %, such as from 0.001 wt % to 30 wt %, from 0.001 wt % to 20 wt %, from 0.001 wt % to 10 wt %, from 0.01 wt % to 5 wt % or less based on the weight of the material of the present invention. The pre-formed whiskers can be uniformly present throughout the material. The pre-formed whiskers can be present as a non-continuous phase. The pre-formed whiskers can be scattered in such a manner that the pre-formed whiskers do not touch each other or rarely do.

The in-situ whiskers and/or pre-formed whiskers can be present in a random manner throughout the matrix or amorphous phase of the material of the present invention. The whiskers can be considered to be in a random alignment in the material of the present invention.

The material of the present invention can be in the form of a sphere, where this sphere is solid or hollow, or has one or more voids present within the sphere. The material can be a sphere or similar shape, which is hollow in the interior of the sphere. The sphere can have a smooth, glassy surface that can contribute to an effective seal against penetration from liquids or gases in the environment.

As an option, the material of the present invention can form a shell around one or more other materials, such as a template or template material, which can be in the form of a sphere or other shape and which can be a solid material or a hollow material. For instance, the material of the present invention can form a shell around a hollow sphere, such as a cenosphere or other similar material. When the material of the present invention is present as a shell and encapsulates one or more other materials, such as a sphere (like a hollow sphere), the coefficient of thermal expansion between the shell and the template material can be the same or within 20% of each other, such as within 10%, within 5%, within 1%, or within 0.5% of each other.

As an option, the present invention relates to a particle or proppant having a template material and shell on the template material, wherein the shell at least includes or is the material of the present invention as described herein. The template material (for instance, a hollow sphere, such as a cenosphere) can have the same components as the shell from the standpoint of having a matrix or amorphous phase that has whiskers or a whisker phase present. For purposes of the present invention, it is to be understood that the template material can have the same or different composition and/or characteristics as the shell with respect to the components present and/or amount of each component. The concentration of the in-situ and/or pre-formed whiskers in the template can be different from the concentration of the in-situ and/or pre-formed whiskers in the shell. For instance, the weight ratio of the concentration of whiskers present in the shell to the concentration of whiskers in the template can be a weight ratio of 50:1, 40:1, 30:1, 25:1, 20:1, 15:1, 10:1, 7:1, 5:1, 4:1, 3:1, 2:1, 1.75:1, 1.50:1, 1.25:1 (shell:template), and the like. For instance, the concentration of the whiskers present in the shell can be the amounts referenced above for the material of the present invention and the amount of the whiskers present in the template can be, for instance, from about 0.1 wt % to 40 wt %, such as from 0.5 wt % to 30 wt %, 0.75 wt % to 20 wt %, 1 wt % to 10 wt %, 1 wt % to 5 wt %, 1 wt % to 3 wt %, wherein this weight is based on the weight of the template material. The exact composition of the shell compared to the template material can be the same or different with respect to the individual components that make up the shell and template.

For purposes of the present invention, the in-situ whisker concentration to pre-formed whisker concentration can be a weight ratio such as from 1000:1, 100:1, 75:1, 50:1, 40:1, 25:1, 10:1, 200:1, 150:1, 100:1, 50:1, 25:1, 10:1, 5:1, 4:1, 3:1, 2:1, 1.75:1, 1.5:1, 1.25:1, 1.1:1, 1:1, 0.9:1, 0.8:1 (in-situ:pre-formed), and the like, wherein this weight ratio is based on the weight percentage of in-situ whiskers compared to the weight percent of pre-formed whiskers present in the material of the present invention (or in the template).

The proppant (or sintered body) can have a hollow core or a solid core, and can have a low specific gravity, for example, a specific gravity in a range of from about 1.0 g/cc to about 2.5 g/cc, while maintaining a crush strength in a range of from about 500 psi to about 20,000 psi, and/or a flexural strength in a range of from about 1 MPa to about 200 MPa, or more.

The proppants of the present invention can provide oil and gas producers with one or more of the following benefits: improved flow rates, enhanced hydrocarbon recovery, improved productive life of wells, improved ability to design hydraulic fractures, and/or reduced environmental impact. The proppants of the present invention are designed to improve flow rates, eliminating or materially reducing the use of permeability destroying polymer gels, reducing pressure drop through the proppant pack, and/or reducing the amount of water trapped between proppants thereby increasing hydrocarbon "flow area." Lower density enhances proppant transport deep into the formation, increasing the amount of fracture-area propped, and thereby increasing the mechanical strength of the reservoir. The low density of the present invention's proppants can reduce transportation costs. Because the proppant is lighter, less pumping force is needed, potentially lowering production costs and reducing damage to the formation.

Proppants of the present invention preferably enable the use of simpler completion fluids and less (or slower) destructive pumping. Formations packed with lower density proppants of the present invention can exhibit improved mechanical strength/permeability and thus increased economic life. Enhanced proppant transport enabled by lower density proppants enable the emplacement of the proppant of the present invention in areas that were previously impossible, or at least very difficult to prop. As a result, the mechanical strength of the subterranean formations can be improved with reduced decline rates over time.

If lower density proppants are employed, water and/or brine solutions can be used in place of more exotic completion fluids. The use of simpler completion fluids can reduce or eliminate the need to employ de-crosslinking agents. Further, increased use of environmentally friendly proppants can reduce the need to employ other environmentally damaging completion techniques such as flashing formations with hydrochloric acid. The low density properties that can be exhibited by the proppants of the present invention eliminates or greatly reduces the need to employ permeability destroying polymer gels as the proppants are more capable of staying in suspension.

The present invention also relates to low density proppants that can be utilized, for example, with water and/or brine carrier solutions.

The proppant can be either solid throughout or hollow within the proppant. In the present invention, a solid proppant is defined as an object that does not contain a void space in the center, although a porous material would be suitable and is optional; a fully dense material is not a requirement of solid proppant. A hollow material is defined as an object that has at least one void space inside (e.g., generally centrally located within the proppant) with a defined size and shape.

The material of the present invention can have isotropic properties and/or anisotropic properties. In other words, the ceramic material can have measurable properties that are identical in all directions (isotropic), but can also have properties that differ according to the direction of measurement (anisotropic).

The template preferably can have a diameter in the size range of, for example, from about 1 nm to about 3000 µm, or from about 25 µm to about 2000 µm, or from about 80 µm to about 1500 µm, or from about 120 µm to about 300 µm.

The proppants of the present application can have a specific gravity of, for example, from about 0.6 g/cc to about 2.5 g/cc. The specific gravity can be, for example, from about 2.0 g/cc to about 2.5 g/cc, from about 1.0 g/cc to about 2.5 g/cc, from about 1.0 g/cc to about 2.2 g/cc, from about 1.0 g/cc to about 2.0 g/cc, from about 1.0 g/cc to about 1.8 g/cc, from about 1.0 to about 1.6 g/cc, or from about 0.8 g/cc to about 1.6 g/cc. Other specific gravities above and below these ranges can be obtained. The term "specific gravity" as used herein is the weight in grams per cubic centimeter (glee) of volume, excluding open porosity in determining the volume. The specific gravity value can be determined by any suitable method known in the art, such as by liquid (e.g., water or alcohol) displacement or with an air pycnometer.

The strength properties of the proppant can be dependent on the application. The proppant can have a crush strength of at least 1,000 psi. The crush strength can be from about 2,000 psi to about 25,000 psi or higher. The crush strengths can be greater than 9,000 psi, greater than 15,000 psi, or greater than 25,000 psi. Other crush strengths below or above these ranges are possible. A crush strength below 3000 psi is an option, such as 500 psi to 3000 psi, or 1000 psi to 2,000 psi. Crush strength can be measured, for example, according to American Petroleum Institute Recommended Practice 60 (RP 60).

The proppant can have any particle size. For instance, the proppant can have a particle diameter of from about 1 nm to 1 cm, from about 1 µm to about 1 mm, from about 10 µm to about 10 mm, from about 100 µm to about 5 mm, from about 50 µm to about 2 mm, or from about 80 µm to about 1,500 µm. The optimum size of the proppant can depend on the particular application.

The clay or clays used can be in uncalcined, partially calcined, and/or calcined forms, or any mixtures of such forms. The term "uncalcined clay" is understood by those of ordinary skill in the art to mean clay in its natural "as-mined" condition. Uncalcined clay has not been subjected to any type to treatment that would result in a chemical or mineralogical change, and can also be referred to as "raw" clay. The terms "partially calcined clay" and "calcined clay" are understood by those of ordinary skill in the art to mean clay that has been subjected to a heat treatment at times and temperatures, typically about 500° C. to 800° C., to remove some (partially calcined) or substantially all (calcined) organic material and water of hydration from the clay.

In the present invention, the present invention also relates to a proppant used to prop open subterranean formation fractions comprising a particle or particles with controlled buoyancy and/or crush strength. The controlled buoyancy can be a negative buoyancy, a neutral buoyancy, or a positive buoyancy in the medium chosen for pumping the proppant to its desired location in the subterranean formation. The medium chosen for pumping the proppant can be any desired medium capable of transporting the proppant to its desired location including, but not limited to a gas and/or liquid, energized fluid, foam, and aqueous solutions, such as water, brine solutions, and/or synthetic solutions. Any of the proppants of the present invention can have a crush strength sufficient for serving as a proppant to prop open subterranean formation fractures.

The proppants of the present invention can comprise a single particle or multiple particles and can be a solid, partially hollow, or completely hollow in the interior of the particle. The particle can be spherical, nearly spherical, oblong (or any combination thereof), or have other shapes suitable for purposes of being a proppant. The proppant may contain filler in addition to the whiskers. The filler is a compound that does not reactively sinter with the ceramic material. Examples of fillers include graphite, metals (e.g., noble metals), metal oxides (e.g., cerium oxide) and metal sulfides (e.g., molybdenum disulfide).

The proppant of the present invention can be a sintered body, such as a sphere having a Krumbein sphericity of at least about 0.5 and a roundness of at least about 0.4. The proppant can include a) a plurality of ceramic whiskers or oxides thereof and b) a glassy phase and c) optionally at least one crystalline phase, such as a non-whisker crystalline phase and d) optionally a plurality of microspheres, wherein the sintered sphere has a diameter of from about 90 microns to 2,500 microns, and the sintered sphere has a specific gravity of from 0.8 g/cc to about 3.8 g/cc, and the proppant has a crush strength of from about 1,000 psi or greater.

The proppants described herein of the present invention can include one or more of the following characteristics:

1) said glassy phase is present in an amount of at least 10% by weight, based on the weight of the proppant (e.g., at least 15%, at least 20%, at least 25%, at least 30%, at least 40%, at least 50%, such as from 15% to 70%, all based on wt %, based on the weight of the proppant);
2) said whiskers, such as ceramic whiskers, have an average length of less than 5 microns (e.g., less than 4 microns, less than 3.5 microns, less than 3.2 microns, less than 3 microns, less than 2.7 microns, less than 2.5 microns, less than 2.2 microns, such as from 0.5 micron to 5 microns, or from 1 micron to 3.5 microns, or from 0.8 micron to 3.2 microns, or from 1 micron to 3 microns or from 1.2 to 1.8 microns);
3) said whiskers, such as ceramic whiskers, have an average width of less than 0.35 micron (e.g., less than 0.3, less than 0.28, less than 0.25, less than 0.2, less than 0.15, such as from 0.05 to 0.34 micron, from 0.2 to 0.33 micron, from 0.1 to 0.3 micron, from 0.12 to 0.2 micron, all units in microns);
4) said whiskers, such as ceramic whiskers, have a whisker length distribution, $d_{as}$, of about 8 or less (e.g., 7 or less, 6 or less, 5 or less, 4 or less, 3 or less, 2 or less, 1 or less, 0.5 or less, 0.4 or less, 0.3 or less, 0.2 or less, such as 0.1 to 8, 0.1 to 7, 0.1 to 6, 0.1 to 5, 0.1 to 4, 0.1 to 3, 0.1 to 2, 0.1 to 1, 0.1 to 0.75, 0.1 to 0.5, 0.1 to 0.3, 0.1 to 0.2, 0.1 to 1.8), wherein, $d_{as}=\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;
5) said proppant having a porosity from about 1% to 70% by weight where $$\text{porosity (\%)} = 100 - \left(\frac{SG_m}{SG_t}\right) \times 100 \text{ and}$$

$SG_m$ = measured specific gravity and $SG_t$ = theoretical specific gravity;

6) said proppant having a porosity from about 5 wt % to 50 wt % by weight of proppant;
7) said proppant having a porosity from about 3 wt % to 20 wt % by weight of proppant;
8) said proppant having a porosity from about 4 wt % to 16 wt % by weight of proppant;
9) said proppant having a specific gravity of from 1.6 to 1.8 with a crush strength of at least 2000 psi;
10) said proppant having a specific gravity of from 1.8 to 2 with a crush strength of at least 3000 psi;
11) said proppant having a specific gravity of from 2 to 2.1 with a crush strength of at least 5,000 psi;
12) said proppant having a specific gravity of from 2.25 to 2.35 with a crush strength of at least 8,000 psi;
13) said proppant having a specific gravity of from 2.5 to 3.2 with a crush strength of at least 18,000 psi;
14) said proppant having a specific gravity of from 2.5 to 3.2 with a crush strength of at least 25,000 psi;
15) said proppant having a combined clay amount and cristobalite amount of less than 20% by weight of proppant;
16) said proppant having a free alpha-alumina content of at least 5% by weight of said proppant (e.g., 5 wt % to 70 wt % or more, at least 10 wt %, at least 20 wt %, at least 30 wt %, at least 40 wt %, based on the weight of the proppant);
17) said proppant having an HF etching weight loss of less than 35% by weight of said proppant (e.g., less than 30% by weight, less than 25% by weight, less than 20% by weight, less than 15% by weight, less than 10% by weight, such as from 10 wt % to 34 wt %, from 15 wt % to 30 wt %, from 18 wt % to 28 wt % by weight of said proppant);
18) said proppant having said microspheres present as hollow glass microspheres having a particle size distribution, $d_{as}$, of from about 0.5 to about 2.7 (e.g., 0.5 to 2.6, 0.8 to 2.2, 1 to 2, 0.5 to 2, 0.5 to, 1.5, 0.5 to 1), wherein, $d_{as}=\{(d_{a90}-d_{a10})/d_{a50}\}$ wherein $d_{a10}$ is a particle size wherein 10% (by volume) of the particles have a smaller particle size, $d_{a50}$ is a median particle size wherein 50% (by volume) of the particles have a smaller particle size, and $d_{a90}$ is a particle size wherein 90% (by volume) of the particle volume has a smaller particle size;
19) said proppant having microspheres present wherein said microspheres are uniformly present in said proppant or in a layered region of said proppant;
20) said whiskers, such as ceramic whiskers, are present in an amount of from 5% to 60% by weight of said proppant (e.g., from 5% to 50%, from 5% to 45%, from 5% to 40%, from 5% to 35%, from 5% to 30%, from 5% to 25%, from 5% to 20%, from 5% to 15%, from 10% to 25%, from 15% to 25%, all by wt % based on the weight of said proppant);
21) said proppant has a combined clay amount and cristobalite amount of less than 20% (e.g., less 15%, less than 10%, less than 5%, less than 1%, such as from 0.1% to 3%, all wt %) by weight of proppant and/or said whiskers, such as mullite whiskers, are present in an amount of 60% or more by weight of said proppant (e.g., from 5% to 50%, from 5% to 45%, from 5% to 40%, from 5% to 35%, from 5% to 30%, from 5% to 25%, from 5% to 20%, from 5% to 15%, from 10% to 25%, from 15% to 25%, all by wt % based on the weight of said proppant);
22) said proppant has a high whisker distribution density based on individual whiskers present in the proppant (# of whiskers per mg of proppant);
23) said proppant has a unimodal whisker distribution;
24) said proppant has at least two layers that form a laminate structure (such as three layers or four layers or five layers);
25) said proppant has at least a first layer and a second layer that form a laminate structure wherein the average length of said whiskers in said first layer compared to said second layer is different;
26) said proppant has at least a first layer and a second layer that form a laminate structure wherein the average width of said whiskers in said first layer compared to said second layer is different;
27) said proppant has a smooth surface comprised of both crystalline and amorphous materials.
28) said whiskers in said proppant are less euhedral and more anhedral;
29) said proppant has at least one region (e.g., one circumference or radial region closer to the outer surface) of first whiskers and at least one region (e.g., one circumference or radial region further away from the outer surface of the proppant) of second whiskers, wherein the average whisker length for the first and second whiskers is different by at least 10% (e.g., at least 15%, at least 20%, at least 25%, at least 30%, at least 35%, at least 40%, at least 45%, at least 50%, at least 55%, at least 60%, at least 70%, at least 80%, at least 90%, at least 100%, at least 120%, at least 140, at least 200% different). Where R is the radius of the proppant and R=0 is the center of the proppant, and R=100 is the outer surface of the proppant, an R from 1 to 50 (e.g., from 5 to 50, from 10 to 40, from 10 to 25, from 10 to 20) can have an average whisker length that is larger than a region where R is greater (an outer region). These regions can be all interior to a shell region if present, or one of the regions can be part of a shell region and the other region can be part of a template or core region that is encapsulated by a shell(s).
30) said proppant has at least one radial region of first whiskers and at least one region of second whiskers, wherein the average whisker width is different by at least 10% (e.g., at least 15%, at least 20%, at least 25%, at least 30%, at least 35%, at least 40%, at least 45%, at least 50%, at least 55%, at least 60%, at least 70%, at least 80%, at least 90%, at least 100%, at least 120%, at least 140, at least 200% different). Where R is the radius of the proppant and R=0 is the center of the proppant, and R=100 is the outer surface of the proppant, an R from 1 to 50 (e.g., from 5 to 50, from 10 to 40, from 10 to 25, from 10 to 20) can have an average whisker width that is larger than a region where R is greater (an outer region).
31) said proppant has a major phase of whiskers of less than one micron and a secondary minor phase of whiskers of one micron or higher; and/or
32) said whiskers, such as ceramic whiskers, have a whisker length distribution having $d_{a90}$, which is a whisker length wherein 90% of the whiskers have a smaller whisker length, of less than 12 microns (e.g., less than 10 microns, less than 8 microns, less than 7 microns, less than 6 microns, less than 5 microns, less than 4 microns, less than 3 microns, less than 2 microns, such as from 1 to 10, 1.5 to 5, 1.7 to 5, 1.8 to 4, 1.9 to 3.5, 1.5 to 3.5).

It is to be understood that all averages and distributions mentioned above or herein are based on measuring at least 50 whiskers picked on a random basis in a proppant. Preferably, at least 10 proppants are measured in this manner and an average obtained.

In the present invention, the one or more of said characteristics mentioned above can provide stress reducing properties on said proppant compared to the same proppant but without said characteristics. The proppant can have an alumina content of at least 35% by weight of said proppant, such as at least 40%, at least 45%, at least 50%, at least 55%, at least 60%, such as from 35% to 55%, all wt % based on the weight of the proppant. The proppant can have mullite whiskers, such as present in an amount of from 10 wt % to 40 wt % by weight of said proppant (e.g., 15 wt % to 30 wt %, or 20 wt % to 25 wt % and the like). The proppant can include quartz. The proppant can have quartz in an amount of from 0.1 wt % to 1 wt % based on the weight of the proppant. The proppant can have at least one layered shell encapsulating a hollow spherical template. The proppant can have at least one layered shell encapsulating a hollow spherical template, and said microspheres (e.g., in-situ formed and/or pre-formed) are present in said at least layered shell.

The present invention also relates to a method of preparing a proppant that employs reactive or reaction sintering to form a unique microstructure, in which anisotropic crystals (such as whiskers, needles, leaves, or fibers) are formed in-situ through the chemical reactions of the raw or starting materials. The raw materials can comprise ceramic precursors, for example, talc, clay, alumina, silica, kyanite, or any combination thereof. The reactive sintering process can produce a ceramic proppant having randomly aligned whiskers that can be formed in-situ and/or introduced through one or more of the starting materials. The method can produce a ceramic proppant comprising anisotropic crystals. The flexural strength of such a proppant can have, for example, at least 50% more strength than a proppant with isotropic structure that can be formed by sintering preformed materials, at the same or about the same specific gravity. The reactive or reaction sintering can form substantially spherical microspheres or pores with a smooth glassy interior wall inside the amorphous phase by controlled release of gaseous materials, such as water, from the at least one amorphous material that contains an entrapped vaporizable material such as water. The reactive or reaction sintering process in the presence of the amorphous material that contains an entrapped vaporizable material such as water, promotes a smooth outer surface on the proppant. The amorphous material that contains an entrapped vaporizable material, such as water, can comprise perlite, stober silica, pumice, andesite, scoria, volcanic glasses or any combinations thereof.

In the present invention, the ceramic particles or any type of proppant particle can benefit from using membrane separation processes for one or more of the starting materials that are used to form the ceramic particles or any type of proppant. The membrane separation processes can be also useful in the final product as well.

The starting material(s) particle size and its distribution can be strictly controlled by membrane separation processes.

The selected incoming raw materials can be dispersed into a slurry, such as an aqueous slurry like water. At least one dispersant can be used as well for improving the dispersion of the slurry. The slurry can be milled, such as through an attrition mill, ball mill, jet mill, hammer mill or any combination thereof. After milling or otherwise obtaining the desired general particle size, the slurry can be diluted to a desirable concentration, then feed into at least one membrane filtration device. By such a process, the larger particles are left in the filtration cake or in the retained slurry while the smaller particles remain in the effluent slurry. With such a process, the larger particles are filtered out. The effluent slurry can be then feed in to a second membrane filter with a smaller pore size. Going through the same process as described above, the filtration cake or the retained slurry having a narrow particle size distribution of raw materials is obtained. Essentially this membrane process permits a very accurate and controlled way to obtain a "cut" of desirable particle sizes, whereby the unwanted smaller particles and the unwanted larger particles are removed.

In the present invention, one can use the above membrane filtration process to separate particles size into various groups, such as with an average particle size of 0.2 micron, 0.5 micron, 1 micron, 1.5 micron, and 2.0 microns, and so on, depending on the membrane pore size. The width of the size distribution can be determined by the two "cuts" of membrane sizes. In general, a much narrower size distribution is desirable for product performance and this process permits such a distribution. In addition to membrane filtration, air classification can be employed alone or in combination with membrane separation to produce the desired mean particle size and/or size distribution.

As an example, raw material particles with the same particle size distributions can be mixed, and then spray coated to form ceramic green spheres, or granulated in a granulator. Due to the same particle sizes, particle packing is well controlled. Pores between particles can be well preserved. During the firing process, particles sinter together, and the porosity can be well preserved after the firing process, with a narrow pore size distribution. By controlling the particle size with the narrow distribution, a pore size can be well controlled after the sintering process. Narrow pore size distribution can be achieved, so that an adequate amount of porosity can be added in to the ceramics, while most of mechanical strength can be preserved.

As a further example, two different size cuts of raw materials can be mixed together (e.g., 2 micron particles mixed with 0.5 micron particles and 0.2 micron particles), going through the forming processes described above. After forming, the green body can be subjected to firing at a high temperature, and a near zero porosity containing proppant can be produced.

In the present invention, two types of a membrane separation device can be used (e.g., a "dead end filtration" and another type is cross flow membrane separation.) The former one can handle a relatively high concentration of slurry, which yield a broader particle size distribution. The later gives very narrow and clean cut particles size distribution.

In the present invention, size control of the raw or starting material, provide the possibility of precise sintering under well controlled firing cycles. So the grain size growth can be controlled, and high strength materials with uniform small grain size materials can be produced under the same specific gravity.

In the present invention, the number of pores and/or pore size can be well controlled, so an adequate amount of porosity can be added into a ceramic proppant, while loss of mechanical strength can be minimized. Therefore, high strength/low specific gravity proppant can be produced. Formation of pores can be enhanced by the addition of an amorphous material that contains an entrapped vaporizable material such as water and releasing the vaporizable material in a controlled rate.

As an option, in the present invention, the various average particle sizes and/or particle size distributions are the same or about the same with respect to each of the starting materials that form the green body. When the particle sizes of one or more, and, preferably all of the starting materials that can have particle sizes, are about the same or the same, the formation of the green body by mixing the various starting materials together can be more uniform and the distribution of the different starting materials gets distributed throughout the green body in a more uniform way, such that the overall green body and the resulting sintered body, such as the proppant, has a uniform distribution of each of the starting materials, thereby forming a very consistent sintered body having consistent properties throughout the sintered body or selected parts or regions thereof, and thereby reducing the chances of a flaw or defect existing in the sintered body. The average particle size and/or distribution of two or more of the starting materials can be within +/−20% of each other, +/−15% of each other, +/−10% of each other, +/−7% of each other, +/−5% of each other, +/−4% of each other, +/−3% of each other, +/−2% of each other, +/−1% of each other, +/−0.75% of each other, +/−0.5% of each other, +/−0.25% of each other, +/−0.1% of each other, +/−0.05% of each other, or +/−0.01% of each other.

As a result of such techniques, such as the membrane filtration device, the particle size distribution for any of the starting materials, such as the ceramic or ceramic precursor, the microsphere former, metal oxide, metals, (or, for that matter, any particulate starting material) and the like can have a particle distribution that is very tight, such that the particle size distribution as defined herein ($d=[(D_{90}-D_{10})/D_{50}]$, wherein d is 0.4 to 1, such as 0.05 to 0.9, 0.07 to 0.5, 0.09 to 0.4, and the like.

The expression "reactive sintering" as used herein, can include a process wherein heat is applied to a composition, causing that composition to undergo, at least in part, a chemical reaction forming a new composition. The composition is heated to below or about its melting point.

The term "green body" or "green pellet" refers to pre-sintered material of this invention that has been shaped from the disclosed compositions but are not sintered. The mixing step typically provides an aqueous dispersion or paste, which is later dried.

Drying can be performed at a temperature in the range of from about 30° C. to 600° C., such as from about 120° C. to 150° C., and can occur over a period of up to about 48 hours, depending on the drying technique employed. Any type of dryer customarily used in the industry to dry slurries and pastes can be used. Drying can be performed in a batch process using, for example, a stationary dish or container. Alternatively, drying can be performed in a spray dryer, fluid bed dryer, rotary dryer, rotating tray dryer or flash dryer. The pellets can be screened to provide a suitable median particle size, preferably after drying. For example, a top screen having a mesh size of about 10 or 11 mesh can be used to screen out the largest particles and a bottom screen having a mesh size of about 18 or 20 can be used to remove the finer particles. The choice of top and bottom screens depends, in part, on the mixture produced and can be adjusted to tailor the median particle size of the mixture. A further screening may take place after sintering. The slurry containing the green body material to form the green body can be sprayed or otherwise applied to a hot plate(s) (horizontal or inclined surface). The hot plate can have a metal or ceramic surface. A burner or a series of burners are located under the plate to provide heat to the hot plate surface. The surface is maintained above the evaporation temperature of the solvent (e.g., water) and preferably a lot higher (e.g., at least 10% higher or at least 30% or at least 50% higher in temperature). The droplet sizes are bigger in size than the desired dried size. For instance, the droplet size can be at least 10% larger, at least 50%, at least 100% larger than the final granule size that forms after evaporation occurs. The process/device described in U.S. Pat. No. 5,897,838 (incorporated in its entirety by reference herein) can be adopted as well for this purpose.

The template material can be porous, non-porous, or substantially non-porous. For purposes of the present invention, a substantially non-porous material is a material that is preferably at least 80 vol % non-porous in its entirety, more preferably, at least 90 vol % non-porous. The template material can be a hollow sphere or it can be a closed foam network, and/or can be a non-composite material. A non-composite material, for purposes of the present invention, is a material that is not a collection of particles which are bound together by some binder or other adhesive mechanism. The template material of the present invention can be a single particle. The template material can be a cenosphere or a synthetic microsphere such as one produced from a blowing process or a drop tower process.

The template material can have a crush strength of 5000 psi or less, 3000 psi or less, or 1000 psi or less. In the alternative, the template material can have a high crush strength such as 1000 psi or more, or from about 3000 psi to 10,000 psi. For purposes of the present invention, crush strength can be determined according to API Practice 60 (2$^{nd}$ Ed. December 1995). A template material having a low crush strength can be used to provide a means for a coating to be applied in order to form a shell wherein the shell can contribute a majority, if not a high majority, of the crush strength of the overall proppant.

The proppant can be spherical, oblong, nearly spherical, or any other shapes. For instance, the proppant can be spherical and have a Krumbein sphericity of at least about 0.5, at least 0.6, at least 0.7, at least 0.8, or at least 0.9, and/or a roundness of at least about 0.4, at least 0.5, at least 0.6, at least 0.7, or at least 0.9. The term "spherical" refers to sphericity and roundness on the Krumbein and Sloss Chart by visually grading 10 to 20 randomly selected particles.

In accordance with the method of the present invention, the ceramic proppant produced as described above may be used as proppants, gravel or fluid loss agents in hydraulic fracturing and/or frac packing. As stated above, the present invention also relates to a proppant formulation comprising one or more proppants of the present invention with a carrier. The carrier can be a liquid or gas or both. The carrier can be, for example, water, brine, hydrocarbons, oil, crude oil, gel, foam, or any combination thereof. The weight ratio of carrier to proppant can be from 10,000:1 to 1:10,000, or any ratio in between, and preferably about 0.1 g proppant/liter fluid to 1 kg proppant/liter fluid.

The present invention, as one example, relates to a method for producing the material of the present invention as stated herein. The starting components used in the methods described herein can be the same components or precursors of the same components mentioned earlier.

The present invention also relates to a method to make strong, tough, and/or lightweight glass-ceramic matrix composites through a self-toughening structure generated by viscous reaction sintering of a complex mixture of oxides. For purposes of this invention, glass-ceramic composite can be a material in which glass can comprise from about 0.01% by weight to about 99.9% by weight, based on the weight of the composite. The typical composition of the starting mixture can include the following oxides and/or their precursors in one form or another: $Al_2O_3$, $SiO_2$, $Fe_2O_3$, $Fe_3O_4$, $K_2O$, $CaO$, $Na_2O$, $TiO_2$, and $MgO$.

The method can include forming a green body. The green body can be formed from a green body material that includes:

i. at least one metal oxide(s) (and preferably at least two different metal oxides, a first metal oxide and a second metal oxide that is different from the first metal oxide) that is preferably capable of forming whiskers in-situ. The metal oxide can be an aluminum oxide and/or an aluminum bearing mineral (or ore) and/or a silicon oxide or a silicon bearing mineral (or ore) or precursors thereof, and ii. at least one amorphous material containing at least one entrapped vaporizable material such as water, and iii. pre-formed whiskers (e.g., ceramic or metal oxide or mineral based whiskers), and iv. at least one whisker promoter, preferably in the absence of halide or halide compounds, or preferably in the absence of fluorine or fluorine compounds.

The green body is then subjected to sintering under sintering conditions to form in-situ the material of the present invention (e.g., a composite having at least one whisker phase and at least one amorphous phase and optionally, at least one crystalline particulate phase).

The at least one metal oxide or precursor thereof can have any particle size distribution. For example, the particle size distribution, $d_{as}$, can be from about 0.5 to about 15, wherein, $d_{as}=\{(d_{a90}-d_{a10})/d_{a50}\}$ wherein $d_{a10}$ is a particle size wherein 10% (by volume) of the particles have a smaller particle size, $d_{a50}$ is a median particle size wherein 50% (by volume) of the particles have a smaller particle size, and $d_{a90}$ is a particle size wherein 90% (by volume) of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The metal oxide(s) or metal oxide precursor can have a median particle size, $d_{a50}$, of from about 0.01 μm to about 100 μm, wherein $d_{a50}$ is a median particle size where 50% (by volume) of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% (by volume) of the particles of the distribution have a smaller particle size.

When preferably two different metal oxides (or precursor thereof) are used, the second metal oxide (or precursor thereof) can have any particle size, such as a particle size distribution, The $d_{as}$ can be from 0.5 to 15, 0.75 to 15, 1 to 15, 1 to 5, 1 to 6, 1 to 8, 5 to 15, 0.5 to 10, 0.5 to 5$d_{ss}$, of from about 0.5 to about 15, wherein, $d_{ss}=\{(d_{s90}-d_{s10})/d_{s50}\}$ wherein $d_{s10}$ is a particle size wherein 10% (by volume) of the particles have a smaller particle size, $d_{s50}$ is a median particle size wherein 50% (by volume) of the particles have a smaller particle size, and $d_{s90}$ is a particle size wherein 90% (by volume) of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5 and the like. The second metal oxide (or precursor thereof) can have a median particle size, $d_{a50}$, of from about 0.01 μm to about 100 μm, wherein $d_{a50}$ is a median particle size where 50% (by volume) of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% (by volume) of the particles of the distribution have a smaller particle size.

As an option, the particle size distribution and/or the median particle size of the first metal oxide or precursor thereof and the second metal oxide or precursor thereof can be the same or different, or can be within 1%, 5%, 10%, 15%, 20%, 25% of each other.

The at least one amorphous material containing at least one entrapped vaporizable material such as water can have any particle size distribution. For example, the particle size distribution, $d_{as}$, can be from about 0.5 to about 15, wherein, $d_{as}=\{(d_{a90}-d_{a10})/d_{a50}\}$ wherein $d_{a10}$ is a particle size wherein 10% (by volume) of the particles have a smaller particle size, $d_{a50}$ is a median particle size wherein 50% (by volume) of the particles have a smaller particle size, and $d_{a90}$ is a particle size wherein 90% (by volume) of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The at least one amorphous material containing at least one entrapped vaporizable material such as water can have a median particle size, $d_{a50}$, of from about 0.01 μm to about 100 μm, wherein $d_{a50}$ is a median particle size where 50% (by volume) of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% (by volume) of the particles of the distribution have a smaller particle size.

The ratio for forming the in-situ formed whiskers in the composite can be from about (20 wt % first metal oxide or precursor/80 wt % second metal oxide(s) or metal oxide precursor) to about (60 wt % first metal oxide or precursor/40 wt % second metal oxide(s) or metal oxide precursor).

The pre-formed whiskers (or pre-formed whisker seeds) can be present in an amount of from 0.01 wt % to 40 wt %, such as from about 2% by weight to about 25% by weight, of the green body material. The inventors have unexpectedly found that whiskers, such as mullite whiskers, incorporated into the green body material acts as whisker formation seeds allowing early onset of whisker formation and at temperatures near the bottom of the range typically required for formation of mullite whiskers. If sintering temperature reaches temperatures of about 1500° C., the conversion of alumina or alumina precursor and siliceous material to glass is nearly complete and an effective composite is not formed. In addition, higher temperatures tend to form pores in the amorphous phase lowering the strength and toughness of the resulting glass-ceramic material. Mullite whiskers can be naturally occurring in cenospheres and can be present in an amount of from about 2% by weight to about 40% by weight of the cenospheres. In addition or alternatively, small mullite whiskers directly formed or ground can be added to the green body material, for instance, in an amount of from about 0.5% by weight to about 2% by weight of the green body material.

The whisker promoter can be $B_2O_3$ and/or one or more transition metal oxides. Examples include, but are not limited to, $Fe_2O_3$, $TiO_2$, CoO, NiO or any combinations thereof. The whisker promoter can be used in any amount, for instance from about 0.1 wt % to 5 wt %, or from about 1% by weight to about 2% by weight of the green body material or mixture. A further novel aspect of the present invention is the use of $B_2O_3$ and/or transition metal oxide whisker promoters that can include $Fe_2O_3$, $TiO_2$, CoO, and/or NiO or any combinations thereof, to control the growth of whiskers, such as mullite whiskers. Materials that promote the formation of mullite whiskers are typically compounds that include fluorine. U.S. Pat. No. 4,911,902 mentions the use of $SiF_4$ in an anhydrous environment to produce bar-like topaz as a precursor to form mullite whiskers. L. B. Kong, et al (L. B, Kong. "Effect of transition metal oxides on mullite whisker formation from mechanochemically activated powders," *Material Science and Engineering* A359 (2003): 75-81, Print.) stated that the addition of transition metal oxides have shown significant influence on the mullite formation temperature and the morphology of the mullite whiskers from the oxide mixtures activated by a high-energy ball milling process. The inventors have unexpectedly found that various transition metal oxides and combinations thereof produce a balance of mullite whiskers and amorphous alumina and silica in a glass-ceramic composite. The transition metal oxides in the present invention can include $Fe_2O_3$, $TiO_2$, CoO, and/or NiO, or combinations thereof. Furthermore, the inventors have unexpectedly discovered that trace amounts of $Fe_2O_3$ and other iron oxide compounds present in cenospheres and fly ash can effectively act as the transition metal oxide promoter.

The inventors have also found that in-situ mullite whiskers in the final product can form when a siliceous material that contains mullite, such as a cenosphere, is saturated with amorphous silica and alumina. After sintering, a phase separation within the amorphous phase of the siliceous material occurs resulting in an amorphous phase deficient in silica and alumina and a crystalline mullite whisker phase. During phase separation, some of the amorphous alumina in the amorphous phase can crystallize and enhance the strength of the resulting composite.

The inventors have also found that a whisker phase, such as a mullite whisker phase, can be formed without production of in-situ mullite. The reactive sintering process effectively can form an amorphous phase and a mullite phase from mullite that existed in the starting green body materials.

Whiskers, such as mullite whiskers, can be present as a result of both reactive sintering and/or whiskers present in the starting green body material.

For exemplary purposes, the following example is provided. Materials other than those mentioned below can be used.

The present invention, as one example, relates to a method for producing a glass-ceramic composite. The method includes the steps of forming a green body. The green body can be formed from a green body material that includes:
 i. (a) alumina and/or at least one alumina precursor, and
   (b) a siliceous material;
 ii. at least one amorphous material containing at least one entrapped vaporizable material such as water, where alumina and silica present in the alumina and/or at least one alumina precursor, and/or siliceous material and/or the at least one amorphous material are present in a weight ratio such that whiskers, such as mullite whiskers, form in said glass-ceramic composite upon sintering, and iii. pre-formed mullite whiskers (e.g., a minor amount), and iv. at least one whisker promoter, preferably in the absence of fluorine or fluorine compounds.

The green body is then subjected to sintering under sintering conditions to form a glass-ceramic composite having at least one whisker phase, such as a mullite whisker phase, and at least one amorphous phase.

The alumina precursor can be or include aluminum hydroxide, bauxite, gibbsite, boehmite or diaspore or any combination thereof. The alumina or alumina precursor can have any particle size distribution. For example, the particle size distribution, $d_{as}$, can be from about 0.5 to about 15, wherein, $d_{as} = \{(d_{a90} - d_{a10})/d_{a50}\}$ wherein $d_{a10}$ is a particle size wherein 10% (by volume) of the particles have a smaller particle size, $d_{a50}$ is a median particle size wherein 50% (by volume) of the particles have a smaller particle size, and $d_{a90}$ is a particle size wherein 90% (by volume) of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The alumina or alumina precursor can have a median particle size, $d_{a50}$, of from about 0.01 μm to about 100 μm, wherein $d_{a50}$ is a median particle size where 50% (by volume) of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% (by volume) of the particles of the distribution have a smaller particle size.

The siliceous material is any silicon containing material, such as silicate containing material, silicon containing minerals or ore, silicates, silicon oxides, and the like. The siliceous material can be or include one or more cenospheres, fly ash or any combination thereof. The siliceous material can be natural, synthetic, or a by-product. The siliceous material can be or include silicate materials, quartz, feldspar, zeolites, bauxite, calcined clays or any combination thereof. The siliceous material can have any particle size, such as a particle size distribution, The $d_{as}$ can be from 0.5 to 15, 0.75 to 15, 1 to 15, 1 to 5, 1 to 6, 1 to 8, 5 to 15, 0.5 to 10, 0.5 to $5d_{ss}$, of from about 0.5 to about 15, wherein, $d_{ss} = \{(d_{s90} - d_{s10})/d_{s50}\}$ wherein $d_{s10}$ is a particle size wherein 10% (by volume) of the particles have a smaller particle size, $d_{s50}$ is a median particle size wherein 50% (by volume) of the particles have a smaller particle size, and $d_{s90}$ is a particle size wherein 90% (by volume) of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5 and the like. The siliceous material can have a median particle size, $d_{a50}$, of from about 0.01 μm to about 100 μm, wherein $d_{a50}$ is a median particle size where 50% (by volume) of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% (by volume) of the particles of the distribution have a smaller particle size.

The amorphous material and/or other material that can contain at least one entrapped vaporizable material can be perlite, stober silica, any amorphous volcanic rock containing silica, alumina, and the like. The amorphous material can have any particle size and/or any particle size distribution. The $d_{as}$ can be from 0.5 to 15, 0.75 to 15, 1 to 15, 1 to 5, 1 to 6, 1 to 8, 5 to 15, 0.5 to 10, 0.5 to 5. The $d_{ss}$ can be from about 0.5 to about 15, wherein, $d_{ss} = \{(d_{a90} - d_{s10})/d_{s50}\}$ wherein $d_{s10}$ is a particle size wherein 10% (by volume) of the particles have a smaller particle size, $d_{s50}$ is a median particle size wherein 50% (by volume) of the particles have a smaller particle size, and $d_{s90}$ is a particle size wherein 90% (by volume) of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5 and the like. The at least one amorphous material containing at least one entrapped vaporizable material, such as water, can have a median particle size, $d_{a50}$, of from about 0.01 μm to about 100 μm, wherein $d_{a50}$ is a median particle size where 50% (by volume) of the particles of the distribution have a smaller particle size. The median particle size, $d_{a50}$, can be from about 1 μm to about 5 μm, from 1 to 5 μm, 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, 10 to 90 μm, 20 to 80 μm, 30 to 70 μm, and the like, wherein $d_{a50}$ is a median particle size where 50% (by volume) of the particles of the distribution have a smaller particle size.

As an option, the particle size distribution and/or the median particle size of the alumina or precursor thereof, the siliceous material, and the at least one amorphous material containing at least one entrapped vaporizable material can be the same or different, or can be within 1%, 5%, 10%, 15%, 20%, 25% of each other.

The ratio for forming in-situ formed mullite whiskers in the glass-ceramic composite can be from about (20 wt % siliceous material/80 wt % alumina or alumina precursor) to about (60 wt % siliceous material/40 wt % alumina or alumina precursor), wherein the wt % of siliceous material is based on $SiO_2$ amount and the alumina/alumina precursor is based on alumina amount. The ratio is calculated using the total weight of siliceous material and alumina present collectively in the alumina or precursor thereof, the siliceous material, and the at least one amorphous material containing at least one entrapped vaporizable material.

The pre-formed whiskers can be obtained from cenospheres themselves. The pre-formed whiskers can be present in an amount of from 0.01 wt % to 40 wt %, such as from about 2% by weight to about 25% by weight, of the cenospheres. Thus, if cenospheres are used in part or entirely as the siliceous material, the cenospheres can serve a dual purpose, namely as the siliceous source and as the pre-formed whisker source for purposes of the method. The pre-formed mullite whiskers can be present in an amount of from about 0.5% by weight to about 20% by weight of said green body material.

The whisker promoter can be one or more transition metal oxides. Examples include, but are not limited to, $B_2O_3$, $Fe_2O_3$, $TiO_2$, $CoO$, $NiO$ or any combinations thereof. The whisker promoter can be used in any amount, for instance from about 0.1 wt % to 5 wt %, or from about 1% by weight to about 2% by weight of the green body material or mixture.

In general, for the methods of the present invention, the green body material can include at least one sintering promoter, such as a sintering aid, a glassy phase formation agent, a grain growth inhibitor, a ceramic strengthening agent, a crystallization control agent, or phase formation control agent, or any combinations thereof. The sintering promoter can be or include zirconium, iron, magnesium, alumina, bismuth, lanthanum, silicon, calcium, cerium, yttrium, a silicate, a borate or any combinations thereof. The sintering promoter can be or include a compound containing zirconium, iron, magnesium, alumina, bismuth, lanthanum, silicon, calcium, cerium, yttrium, a silicate, a borate or any combination thereof.

The green body material can include at least one binder. The binder can be or include a wax, a starch, polyvinyl alcohol, a sodium silicate solution, or a low molecular weight functionalized polymer (e.g., 1,000 MW to 100,000 MW or 500 MW to 5,000 MW) or any combinations thereof. A binder may be used to facilitate the formation of the green body mixture.

The green body material can further include at least one dispersant. The dispersant can be or include at least one surfactant. A dispersant may be used to facilitate a uniform mixture of alumina or alumina precursor and a siliceous material in the green body material. Specific dispersants can include, but are not limited to, DOLAPIX CE 64 (Zschimmer & Schwarz, GmbH), DARVAN C (RT Vanderbilt Company, Industrial Minerals & Chemicals) and similar materials which may comprise from about 0% by weight to about 5% by weight of the green body material or any other amount to assist in the dispersion of materials.

The green body material can include at least one fluxing agent. The fluxing agent can be or include nepheline syenite, feldspar, synthetic clay, natural clay or any combinations thereof. The fluxing agent can be present in an amount of from about 0.1 wt % to about 25 wt %, based on the weight of the green body material.

The green body material can further include at least one slurrying agent. The slurrying agent can be or include water, an organic solvent or any combinations thereof. The slurrying agent can be present in an amount of from about 5 wt % to about 60 wt %, based on solid loading.

The green body can be formed as one material or can be formed as one or more layers of green body material. Each layer can be the same or different from each other with respect to composition and/or thickness. The thickness of each layer can be any amount, such as from 1 micron to 1,000 microns. The thickness can be uniform or non-uniform.

The green body can be produced by spray drying, die pressing, extrusion coating, fluidized bed coating, mixer granulation, high shear mixing, roller compaction injection molding, tumbling or any combination thereof.

The green body can further include a template, wherein the green body material coats, forms a layer(s), or encapsulates the template, such as a solid or hollow template. The template can be or include a cenosphere, a micro glass sphere, a synthetic cenosphere, a polymer bead or any combinations thereof.

When a template is present and is a cenosphere or other ceramic material, the sintering in the process of the present invention can form at least one whisker phase, such as mullite whisker phase, and an amorphous phase in the template.

The green body can be formed by deposition of the green body material onto a template such as a hollow template. The deposition can be achieved by spray drying, fluidized bed coating or any combinations thereof. The spray drying can be performed at an air temperature of from about 40° C. to about 90° C., an air flow of from about 90 liters per minute to about 150 liters per minute, and/or a nozzle air pressure of from about 10 psig to about 25 psig.

The sintering can be performed in the presence of a gas. The gas can be or include oxygen, such as from about 100 ppm to about 100% by weight oxygen, or from about 250 ppm to about 90% by weight oxygen, or from about 500 ppm to about 79% by weight oxygen, or from about 1000 ppm to about 50% by weight oxygen.

The sintering can occur in any sintering device (e.g., furnace, oven) such as with induction heating. The sintering is controlled so as to promote reactive or reaction sintering and not solid state sintering. The sintering can occur in a rotary kiln, microwave, tunnel kiln, shutter kiln, electric furnace, gas furnace, convection furnace, roller hearth, chain hearth, pusher sled, vertical shaft furnace or any combinations thereof. The sintering can be self-propagation high temperature sintering, radiation sintering, plasma sintering, spark plasma sintering and the like.

The sintering can be performed under a pressure of from about $0.1 \times 10^5$ Pa to about $10 \times 10^5$ Pa, such as from about $0.5 \times 10^5$ Pa to about $7 \times 10^5$ Pa, or from about $1 \times 10^5$ Pa to about $5 \times 10^5$ Pa.

The sintering can be performed at a temperature from about 500° C. to about 2500° C. The sintering can be performed at an elevated pressure, for instance, at a pressure from about 0.1 MPa to about 200 MPa for about 1 hour to about 20 hours. The sintering preferably occurs at a temperature below 1400° C., such as from 1100° C. to about 1300° C., for about 30 minutes to 8 hours, and more preferably from 2 to 6 hours. The sintering temperatures referred to herein are the temperature of the material being sintered. Other sintering temperatures/times can be at a temperature from about 1100° C. to about 1300° C. for about 1 hour to about 20 hours. Another example of the pressure during sintering is from about 0.1 MPa to about 200 MPa.

The sintering can be performed at any firing rate, such as a firing rate of from about 0.01° C./min to about 2000° C./min.

As indicated above, the final product, for instance formed from this method or other methods can be composite material, such as a glass-ceramic composite material that is or includes a sintered body having at least one whisker phase and an amorphous phase and optionally, at least one crystalline phase, such as a crystalline particulate phase. The amorphous phase can be or include at least one ceramic or metal oxide. The amorphous phase can further include unreacted particles, such as unreacted metal oxide(s). The composite material can further include a template. The template can be a solid or hollow sphere. The hollow sphere can be or include at least one cenosphere, a micro glass sphere, a synthetic cenosphere, a polymer bead or any combination thereof. The template can have or include at least one whisker phase (e.g., in-situ mullite whisker phase) and an amorphous phase. The whiskers in the composite can have diameters of from about 0.05 µm to about 2 µm, and/or aspect ratios of from about 10 to about 50, and/or lengths of from about 1 µm to about 50 µm.

The phases of the glass-ceramic composite can be or have 3-3 connectivity for the whisker phase and the amorphous phase. The phases of the composite can be or have 3-3-0 connectivity for the whisker phase, the amorphous phase and the unreacted metal oxide, respectively. The phases can be or have 3-3-0-0 connectivity for the whisker phase, the amorphous phase, and the two or more types of unreacted metal oxide material (unreacted first metal oxide and unreacted second metal oxide) respectively.

The amorphous phase can include or be ceramic, and for instance can include alumina and/or silica. The amorphous phase can further include unreacted material (e.g., particles), such as alumina, alumina precursor, siliceous material, and/or the amorphous material (e.g., perlite) or any combination thereof.

Referring to the preferred method and starting ingredients, the final product, for instance, formed from this method or other methods can be a glass-ceramic composite material that is or includes a sintered body having at least one whisker phase, such as a mullite whisker phase, and an amorphous phase. The amorphous phase can be or include at least one ceramic, such as alumina and/or silica. The amorphous phase can further include unreacted particles, such as alumina, alumina precursor, siliceous material or any combinations thereof. The composite material can further include a template. The template can be a solid or hollow sphere. The hollow sphere can be or include at least one cenosphere, a micro glass sphere, a synthetic cenosphere, a polymer bead or any combination thereof. The template can have or include at least one whisker phase, such as a mullite whisker phase, (e.g., in-situ mullite whisker phase) and an amorphous phase. The whiskers, such as mullite whiskers, in the glass-ceramic composite can have diameters of from about 0.05 μm to about 2 μm, and/or aspect ratios of from about 10 to about 50, and/or lengths of from about 1 μm to about 50 μm.

The phases of the glass-ceramic composite can be or have 3-3 connectivity for the whisker phase (e.g., mullite whisker phase) and the amorphous phase. The phases of the glass-ceramic composite can be or have 3-3-0 connectivity for the whisker phase (e.g., mullite whisker phase), the amorphous phase and the unreacted alumina or alumna precursor, respectively. The phases of the glass-ceramic composite can be or have 3-3-0 connectivity for the whisker phase (e.g., mullite whisker phase), the amorphous phase and the unreacted siliceous material, respectively. The phases of the glass-ceramic composite can be or have 3-3-0-0 connectivity for the whisker phase (e.g., mullite whisker phase), the amorphous phase, the unreacted siliceous material and the unreacted alumina or alumna precursor, respectively.

The amorphous phase can include or be ceramic, and for instance can include alumina and/or silica. The amorphous phase can further include unreacted material (e.g., particles), such as alumina, alumina precursor, siliceous material, amorphous material (e.g., perlite), or any combination thereof.

As indicated, the composite of the present invention can be considered a proppant or used as a proppant.

The proppant can have at least one of the following characteristics:
a. an overall diameter of from 80 microns to about 3,000 microns or 90 microns to 2,000 microns;
b. Krumbein sphericity of at least about 0.5 and a roundness of at least about 0.5;
c. a crush strength of about 10 MPa or greater;
d. a specific gravity of from about 1.0 to about 3.0;
e. a porosity of from about 1% to about 70%;
f. at least 90% (by number or by volume) of proppant pores having a pore size of from about 0.1 μm to about 10 μm,
g. at least 80% (by number or by volume) of proppant pores are not in contact with each other,
h. pores that are generally spherical in shape and have a smooth, glassy interior surface.
i. a smooth external surface.

All of a. through i. can be present, or any two, three, four, five, six, seven, or eight of the properties/characteristics.

The proppants can be used in a method to prop open subterranean formation fractures and can involve introducing a proppant formulation that includes one or proppants of the present invention, into the subterranean formation. The method can be for treating a subterranean producing zone penetrated by a well bore, and can include the steps of preparing or providing a treating fluid that includes a fluid, energized fluid, foam, or a gas carrier having the proppant of the present invention suspended therein, and pumping the treating fluid into the subterranean producing zone whereby the particles are deposited therein. The treating fluid can be a fracturing fluid and the proppant particles can be deposited in the fractures formed in the subterranean producing zone. The treating fluid can be a gravel packing fluid and the particles can be deposited in the well bore adjacent to the subterranean producing zone.

The present invention further relates to a matrix that includes a plurality of the proppants of the present invention and at least one solid matrix material in which the proppant is distributed.

The configuration of the glass-ceramic article being formed can take many shapes including a sphere, elliptical, doughnut shape, rectangular or any shape necessary to fulfill a useful application. In the case of a sphere, the sphere can encapsulate a template. The template may be a hollow or solid, and may be a glassy or glass-ceramic sphere, or an organic sphere. Hollow spheres are typically used as templates in applications where it is desirable to produce particles with low specific gravity. Spheres with an overall diameter from about 90 μm to about 2000 μm (e.g., 100 μm or higher) are typical for proppants. FIG. 1 shows such a proppant with an outer shell and an inner shell. Mechanical analysis of ceramic or glass-ceramic spheres including a hollow template under load indicates that tensile stress is the major cause of the fracture since the ceramic materials are typically strong in compressive strength but weak in tensile strength. Because of this, making the inner shell strong and tough has been a great challenge. The present invention toughens the inner shell by converting the template into a special textured microstructure with the toughening agent generated in-situ. The toughening agent can be entangled whiskers, such as mullite whiskers, with diameters from about 0.05 μm to about 2 μm, and/or aspect ratios from about 10 to about 50, and/or lengths from about 1 μm to about 50 μm with the interstitial space filled with glasses (e.g., a glassy phase or amorphous phase), such as alumina and/or silica and/or other particulate materials. Any unreacted metal oxide particulates, such as alumina and/or other particulate ceramic material(s), can serve as a toughening agent.

Furthermore, the at least one amorphous material containing at least one entrapped vaporizable material, when sintered under controlled conditions, promotes a smooth surface at the template interface, at the outer surface of the proppant, and/or at any location within the proppant. Small, spherical pores are produced by the liberation of water or other vaporizable material under controlled sintering conditions with a smooth, glassy interior surface. The smooth surfaces as described above can contribute to increased strength and toughness in the proppant. The surface roughness for a proppant made from a green body that included an amorphous material with an entrapped vaporizable material generally has a lower surface roughness by at least 1%, at least 5%, at least 10%, at least 15%, at least 20%, compared to the same proppant but without using an amorphous material having an entrapped vaporizable material.

The composition of the outer shell surrounding the template can be so designed that the components of the outer shell react with the template (part or all of the template) to convert it in situ into a preferably tough glass-ceramic structure with a microstructure having a mullite whisker-reinforced composite. Both the outer shell and the template can undergo viscous reaction sintering to produce a glass-ceramic composite with 3-3, 3-3-0, 3-3-0-0, 3-2, 3-2-0, 3-2-0-0, 3-1, 3-1-0 or 3-1-0-0 connectivity in each phase in the structure. A phase connectivity of 3 means that the material in that phase is self-connected in three dimensions. A phase connectivity of 2 means that the material in that phase is self-connected in two dimensions. A phase connectivity of 1 means that the material in that phase is self-connected in one dimension. A phase connectivity of 0 means that the material in that phase is not self-connected. A 3-3-0 connectivity composite is one where one phase, typically the glass or ceramic phase, is self connected in three dimensions, a second phase, typically the infiltrate or whisker phase, is self connected in three dimensions and a third phase, typically particulates or other materials embedded in the glass or ceramic phase is not self connected as in the case of discrete particles. When the concentration of whiskers, such as mullite whiskers, is high, the whiskers can have a 3 connectivity because the whiskers are in close proximity to each other and become entangled in three dimensions. When the concentration of whiskers, such as mullite whiskers, is relatively low, the whiskers can have a 1 connectivity where the whiskers are not in close proximity and tend to exist as discrete and separate whiskers aligned in one dimension. A viscous phase is distributed uniformly around the whiskers and after viscous reaction sintering forms a glassy phase with 3 connectivity where the glassy material is self connected in three dimensions. The resulting composite of a high concentration of whiskers in a glassy matrix has 3-3 connectivity. Production of the glassy phase can be accomplished by viscous reaction sintering of a) alumina, aluminum hydroxide, bauxite, gibbsite, boehmite or diaspore or any combination thereof; and b) a siliceous material such as ground cenospheres, fly ash, silica, silicate materials, quartz, feldspar, zeolites, bauxite, calcined clays or any combination thereof; and c) the at least one amorphous material containing at least one entrapped vaporizable material such as water such as perlite, stober silica, or any combination thereof. There may be, as an option, unreacted particles of alumina, aluminum hydroxide, bauxite, gibbsite, boehmite or diaspore, ground cenospheres, fly ash, silica, silicate materials, quartz, feldspar, zeolites, bauxite, calcined clays, perlite, pumice, volcanic glass, and/or stober silica remaining in the glassy phase. These remaining unreacted particles are not self-connected and have 0 connectivity.

As mentioned above, it can be difficult to disperse whiskers in a viscous green body material. A novel element of this invention is the in situ formation of whiskers in a glassy matrix. As an example, alumina or alumina precursor particles can be combined with a siliceous material (e.g., ground cenospheres) in a weight proportion that favors formation of whiskers, such as mullite whiskers, under conditions of reactive sintering.

The proportion of alumina to silica in the green body mixture of alumina or alumina precursor, siliceous material preferably ground cenospheres and the at least one amorphous material containing at least one entrapped vaporizable material such as water, preferably perlite, can be selected to favor the formation of whiskers, such as mullite whiskers, in the glass-ceramic composite matrix. The stoichiometric amount can be about 28 parts of silica by weight and about 72 parts of alumina by weight, based on the weight of the green body. The ratio may range from about 20 parts silica by weight:about 80 parts alumina by weight to about 60 parts silica by weight:about 40 parts alumina by weight, based on the weight of the green body.

In the case of spherical glass-ceramic composite particles including a hollow template, the composition of the outer shell preferably has a coefficient of thermal expansion matching that of the template. If the expansion of the inner and outer shells is significantly different, cracks may form at the interface between the inner and outer shell and strength of the resulting particle is negatively affected. The reactants in the outer shell structure react during firing at typically 1200° C. but can be in the range of 1100° C.-1300° C., to form whiskers, such as mullite whiskers, and alumina/silica composites. The whiskers, such as mullite whiskers, can form in the outer shell, the template (inner shell), or both. The sintered shell becomes a glass-ceramic composite, such as with 3-3-0 connectivity or 3-1-0 connectivity depending upon the concentration of whiskers, such as mullite whiskers, formed.

Examination of fractures in glass-ceramic composites with whiskers (e.g., mullite whiskers) show the amorphous phase and the whisker phase. FIG. 2 is an SEM image showing the microstructure of in-situ formed microwhiskers on the free and fracture surfaces of a proppant. FIG. 3 shows the pull-out effect of the whiskers was also observed on the fracture surface of the proppant sample, indicating the toughening effect of the whiskers. Typically, the diametral splitting tensile strength of the composites mentioned above is over 100 MPa (14500 p.s.i.) (e.g., 100 MPa-300 MPa) for an apparent density around 2.5 g/cm$^3$.

In one preferred method, a glass-ceramic composite may be produced by the following general method.

1. Alumina, cenospheres, and perlite are ground into an indicated fine particle size and particle size distribution. The alumina, cenospheres, perlite and any other components, can be ground independently and blended, or they can be blended and then co-milled. In either case, the alumina can be homogenously mixed with and distributed in the cenosphere material and the perlite or other ceramic materials or ingredients.
2. The alumina, cenospheres, perlite, and any other components and water are added in a predetermined ratio to a high intensity mixer, and stirred to form a wet homogeneous particulate mixture. Optionally, a whisker promoter such as $Fe_2O_3$ may be added. Suitable commercially available intensive stirring or mixing devices used for this purpose can have a rotatable horizontal or inclined circular table and a rotatable impacting impeller, such as described in U.S. Pat. No. 3,690,622, to Brunner, the entire disclosure of which is incorporated herein by reference.
3. While the mixture is being stirred, sufficient water can be added to cause the formation of a composite, that is essentially spherical pellets of desired size from the mixture of alumina, cenospheres, perlite and any other components such that intense mixing action can rapidly disperse the water throughout the particles. In general, the total quantity of water that is sufficient to cause essentially spherical pellets to form is from about 15 to about 30 percent by weight of the mixture of alumina, cenospheres, perlite and any other components. The total mixing time can be, for example, from about 2 to about 15 minutes, or other time periods depending on equipment, settings, compositions, and conditions used. Those of ordinary skill in the art will understand how to determine a suitable amount of water to add to the mixer so that substantially round and spherical pellets are formed.

4. Optionally, a minor amount of whiskers, such as mullite whiskers, may be added to the green body material. The minor amount of whiskers act as seed whiskers to promote the formation of the whiskers, such as mullite whiskers, (e.g., at an early stage) in the viscous reactive sintering process. When materials, such as ground cenospheres of fly ash, are used as the siliceous material, a minor amount of whiskers, such as mullite whiskers, can be naturally present in the cenospheres or fly ash and supplemental addition of mullite whiskers may be avoided. The presence of seed mullite whiskers is effective in production of a whisker phase and a glass-ceramic phase in the resulting composite.

5. Optionally, a binder, for example, various resins or waxes, starch, or polyvinyl alcohol, may be added to the initial mixture to improve the formation of pellets and to increase the green strength of the unsintered pellets. Suitable binders include, but are not limited to, corn starch, polyvinyl alcohol or sodium silicate solution, or a blend thereof. Liquid binders can be added to the mixture and bentonite and/or various resins or waxes known and available to those of ordinary skill in the art may also be used as a binder. A suitable binder can be, for example, CERAFIX K33 (Zschimmer & Schwarz, Inc.—U.S. Division, Milledgeville, Ga.) or PVA 405 (Kuraray America, Inc., Houston, Tex.) and similar materials, which may be added at levels of from about 0 percent by weight to 10% by weight, or from 0.25% by weight to 1% by weight, or any other amount so as to assist formation of the pellets. Whether to use more or less binder than the values reported herein can be determined by one of ordinary skill in the art through routine experimentation.

6. Optionally, a dispersant such as a surfactant may be added to the initial mixture to improve the homogeneity of the green body material, improve the dispersion of particulates such as the metal oxide(s), pore formers such as SiC binder and other materials and decrease the number of pore former particles that are in contact with each other. The dispersant also effectively reduces the time required to make a uniform mixture. Specific dispersants can include but are not limited to DOLAPIX CE 64 (Zschimmer & Schwarz, GmbH), DARVAN C (RT Vanderbilt Company, Industrial Minerals & Chemicals) and similar materials which may be present in an amount of from about 0% by weight to about 5% by weight of the green body material or any other amount to assist in the dispersion of materials in the slurrying agent.

7. Optionally, a sintering aid may be added to the initial mixture to enhance the bonding of particles in the ceramic and speed the sintering process by providing an internal source of oxygen. Sintering aids can include, but are not limited to, magnesium oxide (MgO), yttrium oxide ($Y_2O_3$) and cerium oxides ($CeO_2$, $Ce_2O_3$). Sintering aids may be present in an amount of from about 0% to about 5% by weight of the green body material or any other amount to enhance and speed the sintering process.

8. Optionally, a fluxing agent may be added to the mixture to enhance the effect of the perlite to promote smooth surfaces and interfaces between material phases; to enhance the production of small, substantially spherical pores with a smooth glassy interior surface; and/or to enhance formation of a smooth surface on the outer surface of the proppant. Fluxing agents can include nepheline syenite, feldspar, synthetic clay, natural clay, or any combination thereof 9. The resulting pellets can be dried and screened to an appropriate pre-sintering size that can compensate for shrinkage that occurs during sintering. Rejected oversized and undersized pellets and powdered material obtained after the drying and screening steps may be recycled. The pellets may also be screened either before drying or after firing or both.

10. The dried pellets are then fired at a sintering temperature for a period sufficient to enable recovery of sintered, spherical pellets having at least one whisker phase, such as a mullite whisker phase; small, substantially spherical pores with a smooth glassy interior surface; a smooth, glassy surface on the outer surface of the proppant; and at least one amorphous phase meeting predetermined strength specifications. The sintered pellets can be screened for sizing purposes.

The present invention includes the following aspects/embodiments/features in any order and/or in any combination:

1. The present invention relates to a method for producing a proppant comprising
   a. forming a green body from a green body material comprising
      i. at least one metal oxide or precursor thereof that is capable of forming whiskers in said proppant and as part of said proppant,
      ii. at least one amorphous material containing at least one entrapped vaporizable material,
      iii. preformed whiskers, and
      iv. at least one whisker promoter, optionally in the absence of fluorine or fluorine compounds;
   b. reactive sintering said green body under reactive sintering conditions to form a sintered body comprising whiskers and at least one amorphous phase.

2. The proppant of any preceding or following embodiment/feature/aspect, wherein said metal oxide comprises alumina.

3. The proppant of any preceding or following embodiment/feature/aspect, wherein said alumina has a specific surface area of from 1 to about 50 $m^2/g$.

4. The proppant of any preceding or following embodiment/feature/aspect, wherein said metal oxide comprises bauxite, alpha, gamma, and/or theta alumina.

5. The proppant of any preceding or following embodiment/feature/aspect, wherein said at least one metal oxide comprises a first metal oxide and a second metal oxide, wherein said first metal oxide and said second metal oxide are different from each other.

6. The proppant of any preceding or following embodiment/feature/aspect, wherein said at least one metal oxide comprises a first metal oxide and a second metal oxide, wherein said first metal oxide and said second metal oxide are different from each other with respect to metal that forms the oxide.

7. The proppant of any preceding or following embodiment/feature/aspect, wherein said amorphous material comprises perlite, stober silica, pumice, andesite, scoria, volcanic glasses, or any combination thereof.

8. The proppant of any preceding or following embodiment/feature/aspect, wherein said vaporizable material comprises water ($H_2O$) carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases, or any combination thereof 9. The proppant of any preceding or following embodiment/feature/aspect, wherein said amorphous material has a lower specific gravity than other said green body materials.

10. The proppant of any preceding or following embodiment/feature/aspect, wherein said method further comprises forming said green body on a template that is porous or non-porous.

11. The proppant of any preceding or following embodiment/feature/aspect, wherein said method further comprises forming said green body around a template so as to encapsulate said template.

12. The proppant of any preceding or following embodiment/feature/aspect, wherein said template is a sphere.

13. The proppant of any preceding or following embodiment/feature/aspect, wherein said template is a hollow sphere.

14. The proppant of any preceding or following embodiment/feature/aspect, wherein said template is a solid sphere.

15. The proppant of any preceding or following embodiment/feature/aspect, wherein said template is a cenosphere.

16. The proppant of any preceding or following embodiment/feature/aspect, wherein said template is an agglomerated mullite or alumina particles (e.g., particle size range of from 20 μm to 500 μm, such as 100-200 μm).

17. The proppant of any preceding or following embodiment/feature/aspect, wherein said reactive sintering at least partially converts said template to a template comprising in-situ whiskers and at least one amorphous phase.

18. The proppant of any preceding or following embodiment/feature/aspect, wherein concentration of in-situ whiskers in said template is different from concentration of whiskers in said sintered body that is on said template.

19. The proppant of any preceding or following embodiment/feature/aspect, wherein said whiskers comprise mineral or metal oxide whiskers.

20. A proppant comprising a sintered body, wherein said sintered body comprises whiskers and at least one amorphous phase.

21. The proppant of any preceding or following embodiment/feature/aspect, wherein said whiskers comprise in-situ whiskers.

22. The proppant of any preceding or following embodiment/feature/aspect, wherein said whiskers are present as a whisker phase that is a continuous phase and optionally, said proppant further comprising at least one crystalline particulate phase.

23. The proppant of any preceding or following embodiment/feature/aspect, wherein said whiskers are present as a whisker phase that is a non-continuous phase.

24. The proppant of any preceding or following embodiment/feature/aspect, wherein said whiskers are uniformly distributed throughout said sintered body.

25. The proppant of any preceding or following embodiment/feature/aspect, wherein whiskers are present in said sintered body in a three-dimensional non-woven structure.

26. The proppant of any preceding or following embodiment/feature/aspect, wherein said whiskers have a phase connectivity of 3.

27. The proppant of any preceding or following embodiment/feature/aspect, wherein said whiskers have a phase connectivity of 2.

28. The proppant of any preceding or following embodiment/feature/aspect, wherein said whiskers are metal oxide or mineral derived whiskers.

29. The proppant of any preceding or following embodiment/feature/aspect, further comprising a template.

30. The proppant of any preceding or following embodiment/feature/aspect, wherein said template is a sphere.

31. The proppant of any preceding or following embodiment/feature/aspect, wherein said template is a hollow sphere.

32. The proppant of any preceding or following embodiment/feature/aspect, wherein said template is a cenosphere.

33. The proppant of any preceding or following embodiment/feature/aspect, wherein said sintered body encapsulates said template.

34. The proppant of any preceding or following embodiment/feature/aspect, wherein said template comprises whiskers and at least one amorphous phase.

35. The proppant of any preceding or following embodiment/feature/aspect, wherein said template comprises whiskers and at least one amorphous phase wherein concentration of whiskers in said template is different from concentration of whiskers in said sintered body that is on said template.

36. The proppant of any preceding or following embodiment/feature/aspect, wherein said template comprise whiskers and at least one amorphous phase wherein concentration of whiskers in said template is lower than concentration of whiskers in said sintered body that is on said template.

37. The proppant of any preceding or following embodiment/feature/aspect, wherein said whiskers in said template and in said sintered body comprise mineral or metal oxide derived whiskers.

38. The proppant of any preceding or following embodiment/feature/aspect, wherein said proppant has at least one of the following characteristics:
   a. an overall diameter of from about 90 microns to about 2,000 microns;
   b. a Krumbein sphericity of at least about 0.5 and a roundness of at least about 0.5;
   c. a crush strength of about 10 MPa or greater;
   d. a specific gravity of from about 1.0 to about 3.0;
   e. a porosity of from about 6% to about 40%;
   f. at least 90% of proppant pores having a pore size of from about 0.1 μm to about 10 μm, and
   g. at least 80% of proppant pores are not in contact with each other.

39. A method to prop open subterranean formation fractures comprising introducing a proppant formulation comprising the proppant of the preceding embodiment/feature/aspect 14 into a subterranean formation.

40. A method of treating a subterranean producing zone penetrated by a well bore comprising the steps of:
   a. preparing or providing a treating fluid that comprises a fluid, energized fluid, foam, or a gas carrier having the proppant of the preceding embodiment/feature/aspect 14 suspended therein, and
   b. pumping said treating fluid into said subterranean producing zone whereby said particles are deposited therein.

41. The method of any preceding or following embodiment/feature/aspect, wherein said treating fluid is a fracturing fluid and said particles are deposited in fractures formed in said subterranean producing zone.

42. The method of any preceding or following embodiment/feature/aspect, wherein said treating fluid is a gravel packing fluid and said particles are deposited in said well bore adjacent to said subterranean producing zone.

43. A method for producing a glass-ceramic composite comprising
   a. forming a green body from a green body material comprising
      i. alumina and/or at least one alumina precursor and a siliceous material in a ratio to form whiskers in said glass-ceramic composite, and
      ii. at least one amorphous material containing at least one entrapped vaporizable material, and
      iii. whiskers, and
      iv. at least one whisker promoter in the absence of fluorine or fluorine compounds;
   b. sintering said green body under sintering conditions to form in situ said glass-ceramic composite comprising at least one mullite whisker phase and at least one amorphous phase.

44. The method of any preceding or following embodiment/feature/aspect, wherein said whiskers in i. and/or iii. are mullite whiskers.

45. The method of any preceding or following embodiment/feature/aspect, wherein said alumina precursor comprises aluminum hydroxide, bauxite, gibbsite, boehmite or diaspore or any combination thereof.

46. The method of any preceding or following embodiment/feature/aspect, wherein said alumina or alumina precursor has a particle size distribution, $d_{as}$, from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size.

47. The method of any preceding or following embodiment/feature/aspect, wherein said alumina or alumina precursor has a particle size distribution, $d_{as}$, from about 1.0 to about 6.0.

48. The method of any preceding or following embodiment/feature/aspect, wherein the median particle size, $d_{a50}$, of said alumina or alumina precursor is from about 0.01 μm to about 100 μm, wherein $d_{a50}$ is a median particle size where 50% of the particles of the distribution have a smaller particle size.

49. The method of any preceding or following embodiment/feature/aspect, wherein the median particle size, $d_{a50}$, of said alumina or alumina precursor is from about 1 μm to about 5 μm, wherein $d_{a50}$ is a median particle size where 50% of the particles of the distribution have a smaller particle size.

50. The method of any preceding or following embodiment/feature/aspect, wherein said siliceous material comprises cenospheres, fly ash or any combination thereof.

51. The method of any preceding or following embodiment/feature/aspect, wherein said siliceous material comprises silicate materials, quartz, feldspar, zeolites, bauxite, calcined clays or any combination thereof.

52. The method of any preceding or following embodiment/feature/aspect, wherein said siliceous material has a particle size distribution, $d_{ss}$, from about 0.5 to about 15, wherein, $d_{ss}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size.

53. The method of any preceding or following embodiment/feature/aspect, wherein said siliceous material has a particle size distribution, $d_{ss}$, from about 1.0 to about 6.0.

54. The method of any preceding or following embodiment/feature/aspect, wherein the median particle size, $d_{s50}$, of said siliceous material is from about 0.01 μm to about 100 μm, wherein $d_{s50}$ is a median particle size where 50% of the particles of the distribution have a smaller particle size.

55. The method of any preceding or following embodiment/feature/aspect, wherein the median particle size, $d_{s50}$, of said siliceous material is from about 1 μm to about 5 μm, wherein $d_{s50}$ is a median particle size where 50% of the particles of the distribution have a smaller particle size.

56. The method of any preceding or following embodiment/feature/aspect, wherein said amorphous material containing at least one entrapped vaporizable material comprises perlite, a stober silica, pumice, andesite, scoria, volcanic glasses or any combination thereof.

57. The method of any preceding or following embodiment/feature/aspect, wherein said vaporizable material comprises water ($H_2O$), carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases, or any combination thereof.

58. The method of any preceding or following embodiment/feature/aspect, wherein said amorphous material containing at least one entrapped vaporizable material has a particle size distribution, $d_{as}$, from about 1.0 to about 6.0.

59. The method of any preceding or following embodiment/feature/aspect, wherein the median particle size, $d_{a50}$, of said amorphous material containing at least one entrapped vaporizable material is from about 0.01 μm to about 100 μm, wherein $d_{a50}$ is a median particle size where 50% of the particles of the distribution have a smaller particle size.

60. The method of any preceding or following embodiment/feature/aspect, wherein the median particle size, $d_{a50}$, of said amorphous material containing at least one entrapped vaporizable material is from about 1 μm to about 5 μm, wherein $d_{a50}$ is a median particle size where 50% of the particles of the distribution have a smaller particle size.

61. The method of any preceding or following embodiment/feature/aspect, wherein said ratio to form whiskers in said glass-ceramic composite is from about 20% $SiO_2$ material/80% $Al_2O_3$ or alumina precursor by weight to about 60% siliceous material/40% alumina or alumina precursor by weight.

62. The method of any preceding or following embodiment/feature/aspect, wherein said mullite whiskers are naturally occurring in cenospheres and comprise from about 2% by weight to about 40% by weight of the cenospheres, wherein said siliceous material comprises cenospheres, and wherein said cenospheres contain said mullite whiskers.

63. The method of any preceding or following embodiment/feature/aspect, wherein said mullite whiskers comprises from about 0.5% by weight to about 20% by weight of said green body material.
64. The method of any preceding or following embodiment/feature/aspect, wherein said whisker promoter comprises $B_2O_3$ and/or at least one transition metal oxide.
65. The method of any preceding or following embodiment/feature/aspect, wherein said transition metal oxide comprises $Fe_2O_3$, $TiO_2$, CoO, NiO, or any combination thereof
66. The method of any preceding or following embodiment/feature/aspect, wherein said whisker promoter comprises from about 1% by weight to about 2% by weight of said green body mixture.
67. The method of any preceding or following embodiment/feature/aspect, wherein said sintering is performed in the presence of a gas.
68. The method of any preceding or following embodiment/feature/aspect, wherein said gas comprises from about 100 ppm to about 100% by weight oxygen.
69. The method of any preceding or following embodiment/feature/aspect, wherein said gas comprises from about 250 ppm to about 90% by weight oxygen.
70. The method of any preceding or following embodiment/feature/aspect, wherein said gas comprises from about 500 ppm to about 79% by weight oxygen.
71. The method of any preceding or following embodiment/feature/aspect, wherein said gas comprises from about 1000 ppm to about 50% by weight oxygen.
72. The method of any preceding or following embodiment/feature/aspect, wherein said sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace or any combination thereof.
73. The method of any preceding or following embodiment/feature/aspect, wherein said sintering is performed under a pressure of from about $0.1 \times 10^5$ Pa to about $10 \times 10^5$ Pa.
74. The method of any preceding or following embodiment/feature/aspect, wherein said sintering is performed under a pressure of from about $0.5 \times 10^5$ Pa to about $7 \times 10^5$ Pa.
75. The method of any preceding or following embodiment/feature/aspect, wherein said sintering is performed under a pressure of from about $1 \times 10^5$ Pa to about $5 \times 10^5$ Pa.
76. The method of any preceding or following embodiment/feature/aspect, wherein said sintering is performed at a temperature from about 500° C. to about 2500° C., and said pressure is from about 0.1 MPa to about 200 MPa for about 1 hour to about 20 hours.
77. The method of any preceding or following embodiment/feature/aspect, wherein said sintering is performed at a temperature from about 1000° C. to about 1400° C., and said pressure is from about 0.1 MPa to about 200 MPa for about one half hour to about 20 hours.
78. The method of any preceding or following embodiment/feature/aspect, wherein said sintering is performed at a firing rate from about 0.01° C./min to about 2000° C./min.
79. The method of any preceding or following embodiment/feature/aspect, wherein the green body material further comprises at least one sintering promoter comprising a sintering aid, a glassy phase formation agent, a grain growth inhibitor, a ceramic strengthening agent, a crystallization control agent, or phase formation control agent, or any combination thereof.
80. The method of any preceding or following embodiment/feature/aspect, wherein said sintering promoter comprises sodium, potassium, cesium (all alkalines) zirconium, iron, magnesium, alumina, bismuth, lanthanum, silicon, calcium, cerium, yttrium, a silicate, a borate or any combination thereof.
81. The method of any preceding or following embodiment/feature/aspect, wherein said sintering promoter comprises a compound containing (alkaline compounds, please expand) zirconium, iron, magnesium, alumina, bismuth, lanthanum, silicon, calcium, cerium, yttrium, a silicate, a borate or any combination thereof.
82. The method of any preceding or following embodiment/feature/aspect, wherein said green body material further comprises a binder.
83. The method of any preceding or following embodiment/feature/aspect, wherein said binder comprises a wax, a starch, polyvinyl alcohol, a sodium silicate solution, a low molecular weight functionalized polymer or any combination thereof.
84. The method of any preceding or following embodiment/feature/aspect, wherein said green body material further comprises a dispersant.
85. The method of any preceding or following embodiment/feature/aspect, wherein said dispersant comprises a surfactant.
86. The method of any preceding or following embodiment/feature/aspect, wherein said green body material further comprises at least one slurrying agent.
87. The method of any preceding or following embodiment/feature/aspect, wherein said slurrying agent comprises water, an organic solvent or any combination thereof
88. The method of any preceding or following embodiment/feature/aspect, wherein said green body material further comprises at least one fluxing agent.
89. The method of any preceding or following embodiment/feature/aspect, wherein said fluxing agent comprises nepheline syenite, feldspar, synthetic clay, natural clay or any combination thereof.
90. The method of any preceding or following embodiment/feature/aspect, wherein said green body comprises at least one or more layers of said green body material.
91. The method of any preceding or following embodiment/feature/aspect, wherein said layers are of differing compositions of said green body material.
92. The method of any preceding or following embodiment/feature/aspect, wherein said mullite whiskers in said glass-ceramic composite have diameters from about 0.05 μm to about 2 aspect ratios from about 10 to about 50, and lengths from about 1 μm to about 50
93. The method of any preceding or following embodiment/feature/aspect, wherein the phases of said glass-ceramic composite comprises 3-3 connectivity for the mullite whisker phase and the amorphous phase.
94. The method of any preceding or following embodiment/feature/aspect, wherein the phases of said glass-ceramic composite comprises 3-3-0 connectivity for the mullite whisker phase, the amorphous phase and the unreacted alumina or alumna precursor.

95. The method of any preceding or following embodiment/feature/aspect, wherein the phases of said glass-ceramic composite comprises 3-3-0 connectivity for the mullite whisker phase, the amorphous phase and the unreacted siliceous material.

96. The method of any preceding or following embodiment/feature/aspect, wherein the phases of said glass-ceramic composite comprises 3-3-0 connectivity for the mullite whisker phase, the amorphous phase and the amorphous material containing at least one entrapped vaporizable material.

97. The method of any preceding or following embodiment/feature/aspect, wherein the phases of said glass-ceramic composite comprises 3-3-0-0-0 connectivity for the mullite whisker phase, the amorphous phase, the unreacted siliceous material, the unreacted alumina or alumna precursor, and the amorphous material containing at least one entrapped vaporizable material.

98. The method of any preceding or following embodiment/feature/aspect, wherein said amorphous phase consists of at least one ceramic comprising alumina, silica, the amorphous material containing at least one entrapped vaporizable material or any combination thereof 99. The method of any preceding or following embodiment/feature/aspect, wherein said amorphous phase further comprises unreacted particles of alumina, alumina precursor, siliceous material, amorphous material containing at least one entrapped vaporizable material or any combination thereof 100. The method of any preceding or following embodiment/feature/aspect, wherein said forming a green body is produced by spray coating, die pressing, extrusion coating, fluidized bed coating, mixer granulation, high shear mixing, roller compaction injection molding, tumbling or any combination thereof.

101. The method of any preceding or following embodiment/feature/aspect, wherein said green body further comprises a hollow template.

102. The method of any preceding or following embodiment/feature/aspect, wherein said hollow template comprises a cenosphere, a micro glass sphere, a synthetic cenosphere, a polymer bead or any combination thereof 103. The method of any preceding or following embodiment/feature/aspect, wherein said green body further comprises a hollow template and said sintering forms at least one whisker phase and an amorphous phase in said template.

104. The method of any preceding or following embodiment/feature/aspect, wherein said green body is formed by deposition of said green body material onto said hollow template.

105. The method of any preceding or following embodiment/feature/aspect, wherein said deposition comprises, fluidized bed spray coating or any combination thereof.

106. The method of any preceding or following embodiment/feature/aspect, wherein said spray coating is performed at an air temperature from about 40° C. to about 90° C., air flow from about 90 liters per minute to about 150 liters per minute, and nozzle air pressure from about 10 psig to about 25 psig.

107. A glass-ceramic composite material comprising a sintered body having at least one whisker phase and an amorphous phase and optionally, at least one crystalline particulate phase.

108. The glass-ceramic composite material of any preceding or following embodiment/feature/aspect, wherein said whisker phase is a mullite whisker phase.

109. The glass-ceramic composite material of any preceding or following embodiment/feature/aspect, wherein said amorphous phase is a ceramics comprising alumina, silica and any combination thereof.

110. The glass-ceramic composite material of any preceding or following embodiment/feature/aspect, wherein said amorphous phase further comprises unreacted particles of alumina, alumina precursor, siliceous material, amorphous material containing at least one entrapped vaporizable material or any combination thereof.

111. The glass-ceramic composite material of any preceding or following embodiment/feature/aspect, further comprising a template.

112. The glass-ceramic composite material of any preceding or following embodiment/feature/aspect, wherein said template is a hollow sphere comprising a cenosphere, a micro glass sphere, a synthetic cenosphere, a polymer bead or any combination thereof.

113. The glass-ceramic composite material of any preceding or following embodiment/feature/aspect, wherein said template is a solid sphere.

114. The glass-ceramic composite material of any preceding or following embodiment/feature/aspect, wherein said template comprises at least one whisker phase and an amorphous phase.

115. The glass-ceramic composite material of any preceding or following embodiment/feature/aspect, wherein said whiskers in said glass-ceramic composite have diameters from about 0.05 µm to about 2 µm, aspect ratios from about 10 to about 50, and lengths from about 1 µm to about 50 µm.

116. The glass-ceramic composite material of any preceding or following embodiment/feature/aspect, wherein the phases of said glass-ceramic composite comprises 3-3 connectivity for the whisker phase and the amorphous phase.

117. The glass-ceramic composite material of any preceding or following embodiment/feature/aspect, wherein the phases of said glass-ceramic composite comprises 3-3-0 connectivity for the whisker phase, the amorphous phase and the unreacted alumina or alumna precursor.

118. The glass-ceramic composite material of any preceding or following embodiment/feature/aspect, wherein the phases of said glass-ceramic composite comprises 3-3-0 connectivity among the whisker phase, the amorphous phase and the unreacted alumina or alumna precursor.

119. The glass-ceramic composite material of any preceding or following embodiment/feature/aspect, wherein the phases of said glass-ceramic composite comprises 3-3-0 connectivity among the whisker phase, the amorphous phase and the amorphous material containing at least one entrapped vaporizable material.

120. The glass-ceramic composite material of any preceding or following embodiment/feature/aspect, wherein the phases of said glass-ceramic composite comprises 3-3-0-0-0 connectivity for the whisker phase, the amorphous phase, the unreacted alumina material, the unreacted siliceous material, and the amorphous material containing at least one entrapped vaporizable material.

121. The glass-ceramic composite material of any preceding or following embodiment/feature/aspect, wherein said composite has at least one of the following characteristics:
   a. an overall diameter of from about 90 microns to about 2,000 microns;
   b. a Krumbein sphericity of at least about 0.5 and a roundness of at least about 0.5;
   c. a crush strength of about 10 MPa or greater;
   d. a specific gravity of from about 1.0 to about 3.0;
   e. a porosity of from about 6% to about 40%;
   f. at least 90% of proppant pores having a pore size of from about 0.1 μm to about 10 μm.
   g. at least 80% of proppant pores are not in contact with each other.

122. A method to prop open subterranean formation fractures comprising introducing a proppant formulation comprising the proppant of the preceding embodiment/feature/aspect 89 into a subterranean formation.

123. A method of treating a subterranean producing zone penetrated by a well bore comprising the steps of:
   a. preparing or providing a treating fluid that comprises a fluid, energized fluid, foam, or a gas carrier having the proppant of the preceding embodiment/feature/aspect 89 suspended therein, and
   b. pumping said treating fluid into said subterranean producing zone whereby said particles are deposited therein.

124. The method of any preceding or following embodiment/feature/aspect, wherein said treating fluid is a fracturing fluid and said particles are deposited in fractures formed in said subterranean producing zone.

125. The method of any preceding or following embodiment/feature/aspect, wherein said treating fluid is a gravel packing fluid and said particles are deposited in said well bore adjacent to said subterranean producing zone.

126. A matrix comprising a plurality of the proppant of the preceding embodiments/feature/aspect 107 and at least one solid matrix material in which the proppant is distributed.

127. A method for producing a proppant comprising
   a. forming a green body from a green body material comprising
      i. at least one metal oxide or precursor thereof that is capable of forming whiskers in said proppant and as part of said proppant, and
      ii. at least one amorphous material containing at least one entrapped vaporizable material, and
      iii. optionally preformed whiskers, and
      iv. at least one whisker promoter, optionally in the absence of fluorine or fluorine compounds; and
      v. at least one carbide or metal carbide,
   b. reactive sintering said green body under reactive sintering conditions to form a sintered body comprising in-situ whiskers and at least one amorphous phase.

128. The method of any preceding or following embodiment/feature/aspect, wherein said carbide is SiC.

129. A proppant comprising a sintered body, wherein said sintered body comprises whiskers, at least one glassy phase, and at least one amorphous phase.

130. The proppant of any preceding or following embodiment/feature/aspect, wherein said sintered body further comprises at least one carbide or metal carbide.

131. The proppant of any preceding or following embodiment/feature/aspect, wherein said at least one carbide is SiC.

132. The proppant of any preceding or following embodiment/feature/aspect, wherein said at least one carbide or metal carbide is present in an amount of from 1% by weight to 25% by weight, based on the weight of the proppant.

133. The proppant of any preceding or following embodiment/feature/aspect, further comprising at least one carbide or metal carbide in particulate form, and at least one crystalline particulate phase.

134. The proppant of any preceding or following embodiment/feature/aspect, wherein said at least one crystalline particulate phase is alumina.

135. The proppant of any preceding or following embodiment/feature/aspect, wherein said whiskers are present as an in-situ whisker phase that is a continuous phase and optionally, at least one crystalline particulate phase.

136. The proppant of any preceding or following embodiment/feature/aspect, wherein said whiskers are present as an in-situ whisker phase that is a non-continuous phase.

137. The proppant of any preceding or following embodiment/feature/aspect, wherein said whiskers are uniformly distributed throughout said sintered body.

138. The proppant of any preceding or following embodiment/feature/aspect, wherein in-situ whiskers are present in said sintered body in a three-dimensional nonwoven structure.

139. A proppant comprising a sintered sphere having a Krumbein sphericity of at least about 0.5 and a roundness of at least about 0.4, and wherein said sphere comprises a) a plurality of ceramic whiskers or oxides thereof and b) a glassy phase and c) optionally at least one non-whisker crystalline phase and d) optionally a plurality of microspheres, wherein said sintered sphere has a diameter of from about 90 microns to 2,500 microns, and said sintered sphere has a specific gravity of from 0.8 g/cc to about 3.8 g/cc, and said proppant has a crush strength of from about 1,000 psi or greater, and wherein said proppant includes one or more of the following characteristics:
   1) said glassy phase is present in an amount of at least 10% by weight, based on the weight of the proppant;
   2) said ceramic whiskers have an average length of less than 3.2 microns;
   3) said ceramic whisker have an average width of less than 0.35 micron;
   4) said ceramic whiskers have a whisker length distribution, $d_{as}$, of about 8 or less, wherein, $d_{as}\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;
   5) said proppant having a specific gravity of from 1.6 to 1.8 with a crush strength of at least 2000 psi;
   6) said proppant having a specific gravity of from 1.8 to 2 with a crush strength of at least 3000 psi;
   7) said proppant having a specific gravity of from 2 to 2.1 with a crush strength of at least 5,000 psi;

8) said proppant having a specific gravity of from 2.25 to 2.35 with a crush strength of at least 8,000 psi;
9) said proppant having a specific gravity of from 2.5 to 3.2 with a crush strength of at least 12,000 psi;
10) said proppant having a specific gravity of from 2.5 to 3.2 with a crush strength of at least 18,000 psi;
11) said proppant having a combined clay amount and cristobalite amount of less than 20% by weight of proppant;
12) said proppant having an free alpha-alumina content of at least 5% by weight of said proppant;
13) said proppant having an HF etching weight loss of less than 35% by weight of said proppant;
14) said proppant having said microspheres present as hollow glass microspheres having a particle size distribution, $d_{as}$, of from about 0.5 to about 2.7, wherein, $d_{as} = \{(d_{a90} - d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size;
15) said proppant having microspheres present wherein said microspheres are uniformly present in said proppant or in a layered region of said proppant;
16) said ceramic whiskers are present in an amount of from 5% to 60% by weight of said proppant.
17) said proppant has a combined clay amount and cristobalite amount of less than 20% by weight of proppant and said mullite whiskers are present in an amount of 60% or more by weight of said proppant;
18) said proppant has a high whisker distribution density based on individual whiskers present in the proppant (# of whiskers per mg of proppant);
19) said proppant has a unimodal whisker distribution;
20) said proppant has at least two layers that form a laminate structure;
21) said proppant has at least a first layer and a second layer that form a laminate structure wherein the average length of said whiskers in said first layer compared to said second layer is different;
22) said proppant has at least a first layer and a second layer that form a laminate structure wherein the average width of said whiskers in said first layer compared to said second layer is different;
23) said whiskers in said proppant are less euhedral and more anhedral;
24) said proppant has at least one radial region of first whiskers and at least one region of second whiskers, wherein the average whisker length is different by at least 10%;
25) said proppant has at least one radial region of first whiskers and at least one region of second whiskers, wherein the average whisker width is different by at least 10%;
26) said proppant has a major phase of whiskers of less than one micron and a secondary minor phase of whiskers of one micron or higher; and/or
27) said ceramic whiskers have a whisker length distribution having $d_{a90}$, which is a whisker length wherein 90% of the whiskers have a smaller whisker length, of less than 12 microns.
140. The proppant of any preceding or following embodiment/feature/aspect, wherein one or more of said characteristics provide stress reducing properties on said proppant compared to the same proppant but without said characteristics.
141. The proppant of any preceding or following embodiment/feature/aspect, wherein said proppant has an alumina content of at least 35% by weight of said proppant.
142. The proppant of any preceding or following embodiment/feature/aspect, wherein said mullite whiskers are present in an amount of from 10% to 40% by weight of said proppant.
143. The proppant of any preceding or following embodiment/feature/aspect, further comprising quartz.
144. The proppant of any preceding or following embodiment/feature/aspect, further comprising quartz in an amount of from 0.1 wt % to 1 wt % based on the weight of the proppant.
145. The proppant of any preceding or following embodiment/feature/aspect, wherein said proppant comprises at least one layered shell encapsulating a hollow spherical template.
146. The proppant of any preceding or following embodiment/feature/aspect, wherein said proppant comprises at least one layered shell encapsulating a hollow spherical template, and said nano-microspheres are present in said at least layered shell.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Example 1

Raw, unexpanded perlite powder (Grade #270, Hess Pumice Products, 100 Hess Dr. Malad City, Idaho 83252) with initial particle size of 595 μm (−30 mesh) was attrition-milled to reach on average particle size of around 0.5 μm and then mixed with cenospheres (Grade Sphere One SG Temperate, 8020 Tyler Blvd, Suite #100, Kish Company Inc. Mentor, Ohio 44060) and alumina (Grade AC-300 Ungrounded, Aluchem, 14782 Beaver Pike, Jackson, Ohio 45640) in deionized water. The mixture was ball-milled with high purity alumina media for 4 hours. Before blending with the perlite, the cenosphere and alumina powders were also attrition-milled down to an average particle size of around 0.5 μm. The mixed slurry was then dried in an oven at 125° C. for 4-8 hours and the dry powder was sieved through a 120 mesh screen. Pellets of approximately 0.5"×0.2" were uniaxially pressed at 12 MPa and sintered at 1175° C.-1250° C. from 2 hours to 6 hours in air. After the firing, the pellets were cleaned.

Split tensile strength was determined by ASTM C 1144-89. "Standard Test Method for Splitting Tensile Strength for Brittle Nuclear Waste Forms." From FIG. 5, it can be seen that a significant increase in strength was achieved as the initial concentration of perlite was increased. Only a slight increase in specific gravity was observed with increasing perlite concentration. Maximum crush strength was achieved near a composition of 50 wt % $Al_2O_3$, 30 wt % Cenoshperes, and 20 wt % Perlite. Reduction in crush strength occurs when the concentration of perlite was increased or decreased from approximately 20 wt %. The possible reasons for improvement in strength may involve (1) reduction in the numbers of pores and sizes of pores without too much increase in specific gravity; (2) smooth pore surfaces and outer surface of the proppant produced by the fused perlite leading to release of stress concentrations at the surface of the pores and the surface of the proppant; and/or (3) optimization in phase constitution (optimization in phase percentages among mullite, alumina and amorphous phases).

X-ray diffraction (phase analysis) was conducted using X-ray diffractometer Siemens D5000. Microstructure. Observations were performed using VEGA-II Scanning Electron Microscopes (Tescan USA Inc. 508 Thomson Park Drive, Cranberry Twp, Pa. 16066). FIG. 6 shows the X-ray diffraction pattern from a sintered pellet where the green body composition was approximately 50 wt % $Al_2O_3$, 30 wt % Cenospheres, 20 wt % Perlite. Corundum (α-Alumina), mullite, and the amorphous material are the major phases indentified in the sintered pellet. The material comprising the wall of a cenosphere had a specific gravity of about 2.65. Unexpanded perlite has a specific gravity of about 2.2. The inclusion of proportionately more perlite relative to cenospheres will reduce the average specific gravity of the proppant. The inclusion of proportionately more perlite relative to cenospheres reduces the number and size of pores produced which tends to increase the average specific gravity of the proppant. The net effect is relatively little change in average specific gravity with an accompanying significant increase in crush strength. This is an unexpected and useful result, improving the balance of crush strength and specific gravity in the proppant. FIG. 7 shows a comparison of various alumina, silica, perlite composites including formulations with no perlite. The compositions containing perlite show an improved balance of specific gravity and crush strength. In FIG. 7, A2, A14, A16SG, A1000, AC2, and AKP50 are grade names of alumina from different vendors. SiC, B4C and PMMA are additives to the standard alumina-cenosphere composition.

FIG. 8 is an image produced from a scanning electron microscope at magnification 5.0 kx showing pores in a proppant produced with the composition: 50 wt % $Al_2O_3$, 30 wt % Cenospheres, 20 wt % Perlite. FIG. 9 is an image produced from a scanning electron microscope at magnification 10.0 kx showing pores in a sintered pellet, where the green body composition was approximately 50 wt % $Al_2O_3$, 30 wt % Cenospheres. The pores in FIG. 8 (50 wt % $Al_2O_3$, 30 wt % Cenospheres, and 20 wt % Perlite) are smaller in number and size when compared to the pores in FIG. 9 (50 wt % $Al_2O_3$ and 30 wt % Cenospheres), demonstrating one of the benefits of incorporating perlite in the proppant formulation.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for producing a proppant comprising
   a. forming a green body from a green body material comprising
      i. at least one metal oxide or precursor thereof that is capable of forming whiskers in said proppant and as part of said proppant, wherein a microstructure of the whiskers includes anisotropic crystals elongated along a C-axis,
      ii. at least one amorphous material containing at least one entrapped vaporizable material,
      iii. preformed whiskers, wherein the preformed whiskers are present in the green body material in an amount less than 2 wt % based on a weight, wherein the preformed whiskers are present as a non-continuous phase of the green body material;
      iv. at least one whisker promoter, optionally in the absence of fluorine or fluorine compounds; and
      v. a fluxing agent:
   b. reactive sintering said green body under reactive sintering conditions to form a sintered body comprising whiskers and at least one amorphous phase, wherein the whiskers are non-uniformly distributed.

2. The method of claim 1, wherein said at least one metal oxide comprises a first metal oxide and a second metal oxide, wherein said first metal oxide and said second metal oxide are different from each other.

3. The method of claim 1, wherein said amorphous material comprises perlite, stober silica, pumice, andesite, scoria, volcanic glasses, or any combination thereof.

4. The method of claim 3, wherein said vaporizable material comprises water ($H_2O$) carbon dioxide ($CO_2$), sulfur dioxide ($SO_2$), hydrogen sulfide ($H_2S$), nitrogen, argon, helium, neon, methane, carbon monoxide (CO), hydrogen, oxygen, hydrogen chloride (HCl), hydrogen fluoride (HF), hydrogen bromide (HBr), nitrogen oxide (NOx), sulfur hexafluoride ($SF_6$), carbonyl sulfide (COS), volcanic gases, or any combination thereof.

5. The method of claim 1, wherein said amorphous material has a lower specific gravity than other said green body materials.

6. The method of claim 1, wherein said method further comprises forming said green body around a template so as to encapsulate said template.

7. The method of claim 6, wherein said reactive sintering at least partially converts said template to a template comprising in-situ whiskers and at least one amorphous phase.

8. The method of claim 1, said green body material comprising
   i. alumina and/or at least one alumina precursor and a siliceous material in a ratio to form whiskers in said glass-ceramic composite, and
   ii. the at least one amorphous material containing at least one entrapped vaporizable material, and
   iii. the preformed whiskers, and
   iv. the at least one whisker promoter, optionally in the absence of fluorine or fluorine compounds;
sintering said green body under sintering conditions to form in situ a glass-ceramic composite comprising at least one mullite whisker phase and at least one amorphous phase.

9. The method of claim 8, wherein the median particle size, $d_{a50}$, of said alumina or alumina precursor is from about 0.01 µm to about 100 µm, wherein $d_{a50}$ is a median particle size where 50% of the particles of the distribution have a smaller particle size.

10. The method of claim 8, wherein the median particle size, $d_{s50}$, of said siliceous material is from about 0.01 µm to about 100 µm, wherein $d_{s50}$ is a median particle size where 50% of the particles of the distribution have a smaller particle size.

11. The method of claim 8, wherein the median particle size, $d_{a50}$, of said amorphous material containing at least one entrapped vaporizable material is from about 0.01 µm to about 100 µm, wherein $d_{a50}$ is a median particle size where 50% of the particles of the distribution have a smaller particle size.

12. The method of claim 8, wherein said alumina or alumina precursor has a particle size distribution, $d_{as}$, from about 0.5 to about 15, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size.

13. The method of claim 8, wherein said siliceous material has a particle size distribution, $d_{ss}$, from about 0.5 to about 15, wherein, $d_{ss}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size.

14. The method of claim 1, wherein the fluxing agent is selected from the group consisting of nepheline syenite, feldspar, synthetic clay, natural clay and combinations thereof.

15. The method of claim 6, wherein the template comprises a different composition than the green body material.

* * * * *